(12) United States Patent
Becker

(10) Patent No.: US 8,114,819 B2
(45) Date of Patent: Feb. 14, 2012

(54) POLYMERS FOR OILFIELD APPLICATIONS

(75) Inventor: Harold L. Becker, Tomball, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/561,740

(22) Filed: Sep. 17, 2009

(65) Prior Publication Data

US 2010/0105580 A1    Apr. 29, 2010

Related U.S. Application Data

(60) Provisional application No. 61/108,607, filed on Oct. 27, 2008.

(51) Int. Cl.
*C09K 8/60* (2006.01)
*C09K 8/588* (2006.01)

(52) U.S. Cl. ......... 507/219; 507/221; 507/224; 507/225

(58) Field of Classification Search ................ 507/219, 507/221, 224, 225
See application file for complete search history.

(56) References Cited

U.S. PATENT DOCUMENTS 4,382,128 A * 5/1983 Li ............................... 524/513
4,640,788 A * 2/1987 Kapuscinski et al. ......... 508/229

* cited by examiner

*Primary Examiner* — Timothy J. Kugel

(74) *Attorney, Agent, or Firm* — Mary H. Drabnis; McGlinchey Stafford, PLLC

(57) ABSTRACT

This invention provides polymers having side chain groups selected from at least one of the following:

a) a group comprising an ester of a polycarboxylic acid or polycarboxylate salt, an aminoalkylphosphate ester, or an ammoniumalkylphosphate ester;

b) a group comprising
   (1) an alkanolamino group,
   (2) a fatty quaternary ammonium moiety,
   (3) a heterocyclic ring moiety having at least five members, which ring has at least one nitrogen atom, said ring further comprising either unsaturation or at least one additional heteroatom, or
   (4) both (2) and (3)

c) a group comprising an alkylamino ethoxylate or an alkylamino propoxylate;

d) a group comprising a trialkylhexahydrotriazine moiety;

e) a group comprising a fatty alkyl ester; and f) a group comprising (i) a group as in a), and (ii) a group as in b).

Also provided are processes for preparing polymers having such side chain groups.

28 Claims, No Drawings

POLYMERS FOR OILFIELD APPLICATIONS

REFERENCE TO RELATED APPLICATIONS

This application claims the benefit of U.S. Provisional Application No. 61/108,607, filed Oct. 27, 2008, the disclosure of which is incorporated herein by reference.

TECHNICAL FIELD

This invention relates to corrosion inhibitors, scale inhibitors, gas hydrate inhibitors, hydrogen sulfide scavengers, and paraffin inhibitors for oilfield applications.

BACKGROUND

Corrosion inhibitors, scale inhibitors, gas hydrate inhibitors, hydrogen sulfide scavengers, paraffin inhibitors, and the like are employed in oilfield applications both in the recovery of hydrocarbons from subterranean formations and in refinery operations. The art continually strives to find better corrosion inhibitors, scale inhibitors, gas hydrate inhibitors, hydrogen sulfide scavengers, and paraffin inhibitors for these applications.

SUMMARY OF THE INVENTION

This invention provides polymers having high density functional group incorporation in a single polymer, which functional groups are capable of corrosion, scale, paraffin, gas hydrate inhibition and/or hydrogen sulfide scavenging, as well as methods for producing such polymers. More particularly, this invention provides polymers that can perform as corrosion inhibitors, scale inhibitors, gas hydrate inhibitors, hydrogen sulfide scavengers, and/or paraffin inhibitors. Methods for preparing such polymers are also provided. One advantage of polymeric molecules is their greater stability relative to small molecules for the same functions. The polymers of this invention can be homopolymers or copolymers. The copolymers can be formed from at least two different monomer species providing the same type of function (e.g., two or more different scale inhibitor monomers), or the copolymers can be formed from at least two different monomer species providing different types of functions (e.g., at least one scale inhibitor monomer and at least one corrosion inhibitor monomer). Thus, by incorporating separate monomer species for at least two different functions in a single polymer, the number of chemicals present on an oil platform can be decreased. Similarly, in some instances, at least two different types of function can be present in one monomer, which monomer is used to form a homopolymer having more than one function, to the same advantage as incorporating separate monomer species of different functionality into one polymer. Two different types of function can be present in one monomer or polymer side chain group at least in situations where the monomer has a tertiary amine that can be quaternized after polymerization (as only partial quaternization of the amine present in the polymer will occur). Another way of achieving this is to use the monomer as a mixture of quaternary ammonium monomers and tertiary amine monomers by partially quaternizing the amine with acid or another quaternizing agent prior to polymerization (resulting in two functions of the same monomer in the polymer).

One embodiment of this invention is a polymer having side chain groups selected from at least one of the following: a) a group comprising an ester of a polycarboxylic acid or polycarboxylate salt, an aminoalkylphosphate ester, or an ammoniumalkylphosphate ester; b) a group comprising an alkanolamino group, a fatty quaternary ammonium moiety, a heterocyclic ring moiety having at least five members, which ring has at least one nitrogen atom, said ring further comprising either unsaturation or at least one additional heteroatom, or both a fatty quaternary ammonium moiety and a heterocyclic ring moiety having at least five members, which ring has at least one nitrogen atom, said ring further comprising either unsaturation or at least one additional heteroatom; c) a group comprising an alkylamino ethoxylate or an alkylamino propoxylate; d) a group comprising a trialkylhexahydrotriazine moiety; e) a group comprising a fatty alkyl ester; and f) a group comprising (i) a citrate ester or salt thereof, an aminoalkylphosphate ester, or an ammoniumalkylphosphate ester, and (ii) an alkanolamino group, a fatty quaternary ammonium moiety, a heterocyclic ring moiety having at least five members, which ring has at least one nitrogen atom, said ring further comprising either unsaturation or at least one additional heteroatom, or both a fatty quaternary ammonium moiety and a heterocyclic ring moiety having at least five members, which ring has at least one nitrogen atom, said ring further comprising either unsaturation or at least one additional heteroatom.

Another embodiment of this invention is a process for preparing polymers, which process comprises bringing together a free radical initiator and monomer species selected from at least one of the following: A) an acryoloyl ester of a polycarboxylic acid or polycarboxylate salt, an acryloyl or acrylamido aminoalkylphosphate ester, or an acryloyl or acrylamido ammoniumalkylphosphate ester; B) an acryloyl alkanolamine, an acrylamido alkanolamine, an acryloyl fatty quaternary ammonium compound, an acrylamido fatty quaternary ammonium compound, an acryloyl or acrylamido compound comprising a heterocyclic ring moiety having at least five members, which ring has at least one nitrogen atom, said ring further comprising either unsaturation or at least one additional heteroatom, a compound comprising both an acrylamido fatty quaternary ammonium moiety and a heterocyclic ring moiety having at least five members, which ring has at least one nitrogen atom, said ring further comprising either unsaturation or at least one additional heteroatom; C) an acryloyl alkylamino ethoxylate, an acryloyl alkylamino propoxylate, an acrylamido alkylamino ethoxylate, or an acrylamido alkylamino propoxylate; D) an acryloyl trialkylhexahydrotriazine or an acrylamido trialkylhexahydrotriazine; E) a fatty alkyl acrylate; and F) an acryloyl or acrylamido compound comprising (I) an acryoloyl ester of a polycarboxylic acid or polycarboxylate salt, an aminoalkylphosphate ester, or an ammoniumalkylphosphate ester, and (II) an alkanolamino group, a fatty quaternary ammonium moiety, a heterocyclic ring moiety having at least five members, which ring has at least one nitrogen atom, said ring further comprising either unsaturation or at least one additional heteroatom, or both a fatty quaternary ammonium moiety and a heterocyclic ring moiety having at least five members, which ring has at least one nitrogen atom, said ring further comprising either unsaturation or at least one additional heteroatom, to form a polymerization mixture, which polymerization reaction mixture is heated to a temperature of at least about 60° C. to form a polymer.

Still another embodiment of this invention is a method for scale inhibition, corrosion inhibition, gas hydrate inhibition, hydrogen sulfide scavenging, and/or paraffin inhibition in a well, central treating area, or refinery, in which method an improvement comprises including a polymer of this invention in the method. The polymer has side chain groups selected from at least one of a), b), c), d), e), and f), where a), b), c), d), e), and f) are as described above.

These and other embodiments and features of this invention will be still further apparent from the ensuing description and appended claims

FURTHER DETAILED DESCRIPTION OF THE INVENTION

The term "side chain group" is used throughout this document to refer to a group on the polymer that is not expected to form part of the backbone of the polymer. As used throughout this document, the phrase "monomer species" is used to differentiate monomers when more than one different monomer is used, whether the monomer has the same function or a different function, as it is understood that more than one molecule of any particular monomer is necessary to form a polymer. The word "function" is used in relation to side chain groups and monomer species throughout this document to refer to the application (function) that the side chain group or monomer species performs (e.g., corrosion inhibitor, scale inhibitor). As used throughout this document, the word "copolymer" is synonymous with the word "heteropolymer".

In the practice of this invention, the polymers are prepared by polymerization of vinylic monomers; that is, molecules with a $CH_2$=CH— group at one end. Thus, without wishing to be bound by theory, the backbone of the polymer is thought to be made up primarily of —$CH_2CH_2$— linkages.

As stated above, the polymers of this invention have side chain groups selected from at least one of the following: a) a group comprising an ester of a polycarboxylic acid or polycarboxylate salt, an aminoalkylphosphate ester, or an ammoniumalkylphosphate ester; b) a group comprising an alkanolamino group, a fatty quaternary ammonium moiety, a heterocyclic ring moiety having at least five members, which ring has at least one nitrogen atom, said ring further comprising either unsaturation or at least one additional heteroatom, or both a fatty quaternary ammonium moiety and a heterocyclic ring moiety having at least five members, which ring has at least one nitrogen atom, said ring further comprising either unsaturation or at least one additional heteroatom; c) a group comprising an alkylamino ethoxylate or an alkylamino propoxylate; d) a group comprising a trialkylhexahydrotriazine moiety; e) a group comprising a fatty alkyl ester; and f) a group comprising (i) an ester of a polycarboxylic acid or polycarboxylate salt, an aminoalkylphosphate ester, or an ammoniumalkylphosphate ester, and (ii) an alkanolamino group, a fatty quaternary ammonium moiety, a heterocyclic ring moiety having at least five members, which ring has at least one nitrogen atom, said ring further comprising either unsaturation or at least one additional heteroatom, or both a fatty quaternary ammonium moiety and a heterocyclic ring moiety having at least five members, which ring has at least one nitrogen atom, said ring further comprising either unsaturation or at least one additional heteroatom. Without wishing to be bound by theory, it is believed that the side chain groups of a) function as scale inhibitors, the side chain groups of b) function as corrosion inhibitors, the side chain groups of c) function as gas hydrate inhibitors, the side chain groups of d) function as hydrogen sulfide scavengers; the side chain groups of e) function as paraffin inhibitors, and the side chain groups of f) function as both scale inhibitors and corrosion inhibitors.

Homopolymers of any one monomer species of a), b), c), d), e), or f) are polymers of this invention. Preferred homopolymers of this invention are homopolymers having side chain groups from a), b), c) or f); that is, those having scale, corrosion, gas hydrate, or both scale and corrosion inhibition functions. More preferred are homopolymers having side chain groups of a) or b).

Any combination of one or more of a), b), c), d), e), and/or f) can be present in a polymer of this invention. When the side chain groups of the polymer are the same, the polymer is a homopolymer, as just described. Preferably, there are two or three different side chain groups in a given copolymer of the invention. It is often preferred to have at least one side chain group from a) or at least side chain group from b) in a copolymer. In other preferred combinations, at least one side chain group from a) and at least one side chain group from b) are present in the copolymer. Preferred combinations of side chain groups include two different groups of a); a) and b); a) and c); a) and d); a) and e); b) and c); three different groups of b); b) and two different groups of a); a) and two different groups of b); a), b), and c); and a), b), and d). Thus, preferred polymers of this invention include bipolymers of a); bipolymers of b); bipolymers of a) and b); bipolymers of a) and c); bipolymers of a) and d); bipolymers of a) and e); bipolymers of b) and c); terpolymers of b); terpolymers of a), a), and b); terpolymers of a), b), and b); terpolymers of a), b), and c); and terpolymers of a), b), and d). More preferred polymers include homopolymers of b), bipolymers of a) and b); terpolymers of a), b), and b); and terpolymers of a), b), and d). Particularly preferred combinations include bipolymers of a) and b).

When there are two or more different side chain groups present in the polymers of the invention, the relative molar amount of any one side chain group to another side chain group in a polymer can vary widely, e.g., from 0.1:1 to 1:0.1. However, in many instances, preferred molar ratios of one side chain group to another side chain group in a polymer are typically about 0.5:1 to about 1:0.5. As those of skill in the art will appreciate, preferred relative amounts of side chain groups can vary widely, depending on the function(s), the particular side chain group(s) for the function(s), the activity of the particular side chain group(s), and the intended use for the polymer.

Polymers of this invention typically have weight average molecular weights ($M_w$) in the range of about 4,000 to about 10,000, with some ranging up to about 100,000, as determined by size exclusion chromatography. The weight average molecular weights of the polymers of this invention vary with the type(s) of side chains present in the polymer, and may also depend on whether the particular polymer is a homopolymer or a copolymer.

A polymer of this invention preferably has a viscosity less than about 3000 cPs at 25° C. When the viscosity of the polymer is higher than about 3000 cPs at 25° C., the polymer can be mixed with a solvent so that the polymer can be used more easily in operations.

Side chain groups of the polymers of this invention that function as scale inhibitors are groups a), which comprise esters of a polycarboxylic acid or polycarboxylate salt, aminoalkyl phosphate esters, and ammoniumalkyl phosphate esters. The ester of a polycarboxylic acid or polycarboxylate salt is connected to the polymer backbone via the ester bond. The polycarboxylate groups of the ester are in the acid form, unless otherwise specified. Polycarboxylate salts are salts of polycarboxylic acids, having monovalent inorganic cations as the counterions. Suitable monovalent inorganic cations include ammonium, or the alkali metal cations, including lithium, sodium, potassium, and the like. Preferred polycarboxylate salts are ammonium salts and sodium salts. Aminoalkyl phosphate esters preferably have one or two amino groups; similarly, ammoniumalkyl phosphate esters preferably have one or two ammonium groups. The aminoalkyl and ammoniumalkyl moieties of their respective phosphate esters preferably have about three to about twenty carbon atoms. The phosphate esters are in terminal positions of the aminoalkyl groups or ammoniumalkyl groups. Both the aminoalkyl and the ammoniumalkyl phosphate esters are connected to the polymer backbone via an amide or an ester bond. For an ammonium cation of an ammoniumalkyl moiety, the counterion is preferably a monovalent inorganic anion, such as a halide, including chloride, bromide, or iodide; chloride is a preferred counterion. Aminoalkyl phosphate esters and ammoniumalkyl phosphate esters are connected to the polymer backbone via an amide or ester bond, preferably an ester bond.

Suitable side chain groups for scale inhibition include, but are not limited to, citrate ester, triammonium citrate ester, trilithium citrate ester, trisodium citrate ester, tripotassium citrate ester, N,N-di(methylphosphate)aminomethyl amide, N,N-di(2-ethylphosphate)aminomethyl amide, N,N-di(3-propylphosphate)aminomethyl amide, 1,3-bis[N,N,N-tri(methylphosphatelammonium chloride]propyl ester, 1,3-bis[N,N,N-tri(2-ethylphosphate)ammonium chloride]propyl ester, 1,3-bis[N,N,N-tri(3-propylphosphate)ammonium chloride]propyl ester, and the like. Preferred side chain groups of a) include citrate ester (acid form), triammonium citrate ester, trisodium citrate ester, N,N-di(2-ethylphosphate)aminomethyl amide, and 1,3-bis[N,N,N-tri(2-ethylphosphate)ammonium chloride]propyl ester. More preferably, the side chain groups of a) include citrate ester.

The side chain groups having corrosion inhibition function in the polymer are b), which comprise an alkanolamino group, a fatty quaternary ammonium moiety, a heterocyclic ring moiety having at least five members and which ring has at least one nitrogen atom, or both a fatty quaternary ammonium moiety and a heterocyclic ring moiety having at least five members and which ring has at least one nitrogen atom. Preferred groups are those comprising a heterocyclic ring moiety. Side chain groups having corrosion inhibition function are usually connected to the polymer backbone via an amine bond, an amide bond, or an ester bond, preferably an amide bond or ester bond; more preferably an ester bond.

Alkanolamino groups for the side chain groups having corrosion inhibition function have one or two alkanol groups, preferably two alkanol groups. The alkanol groups of the alkanolamino groups have one to about twelve carbon atoms, preferably one to about four carbon atoms; examples of alkanolamino groups include, but are not limited to, methanolamino, dimethanolamino, ethanolamino, diethanolamino, n-propanolamino, di-n-propanolamino, isopropanolamino, di-isopropanolamino, n-butanolamino, di-n-butanolamino, sec-butanolamino, di-sec-butanolamino, pentanolamino, dipentanolamino, hexanolamino, and dihexanolamino groups. Preferred alkanolamino groups include diethanolamino groups.

The fatty quaternary ammonium moieties of the side chain groups for corrosion inhibition are quaternary ammonium cations in which four alkyl groups are bound to the quaternary nitrogen atom. The alkyl groups can be the same or different, and are linear, branched, or cyclic, preferably linear. Each alkyl group independently has one to about thirty carbon atoms; one of the alkyl groups is bound to the amino, amido, or ester group connected to the polymer backbone. For the quaternary ammonium cation of a fatty quaternary ammonium moiety, the counterion is preferably a monovalent anion, including methylsulfate, ethylsulfate, propylsulfate, and the like; methylsulfate is a preferred counterion.

Corrosion inhibitor side chain groups in which a heterocyclic ring moiety is present preferably have either one or two heterocyclic ring moieties. Each heterocyclic ring moiety preferably has five members or six members, more preferably five members. Preferably, the heterocyclic ring has one nitrogen atom, one nitrogen atom and one oxygen atom, or two nitrogen atoms as the ring heteroatoms. When there is only one heteroatom in the ring, the ring is unsaturated. Suitable heterocyclic ring moieties include pyridyl, pyrrolinyl, imidazolidinyl, 2-imidazolinyl, oxazolidinyl, and the like. Preferred heterocyclic ring moieties include pyridyl, pyrrolinyl, imidazolidinyl, 2-imidazolinyl, and oxazolidinyl. Preferred combinations for side chain groups in which there are two heterocyclic ring moieties include pyrroline and oxazolidine; 2-imidazoline and oxazolidine; and imidazolidine and oxazolidine. At least one substituent, preferably one or two substituents, may be present on the heterocyclic ring, and a substituent can be bound to a heteroatom or to a carbon atom of the ring. When there is more than one substituent on the ring, it is preferred that one of the substituents is bound to a heteroatom, and any other substituents are bound to carbon atoms of the ring. When there are two substituents, it is preferred that one substituent is bound to a heteroatom, while the other substituent is bound to a carbon atom of the ring. Substituents on the heterocyclic ring include alkylamino groups; alkyl groups; and aryl groups, preferably a phenyl group. The heterocyclic ring moiety or moieties can be part of a polycyclic ring system, if desired.

When both a fatty quaternary ammonium moiety and a heterocyclic ring moiety are present in the side chain groups for corrosion inhibition, the preferences for these moieties are as just described individually for the fatty quaternary ammonium moieties and the heterocyclic ring moieties. In these side chain groups, a heterocyclic ring moiety can be a substituent on an alkyl group of the fatty quaternary ammonium moiety, or the quaternary ammonium cation can be a nitrogen atom of a heterocyclic ring.

Examples of suitable side chain groups for corrosion inhibition include 2-imidazolinylmethyl ester, amino-2-imidazolidinyl, N-2-[3-(2-phenyl)-2-imidazolinyl]ethylamino methyl amido, {N-2-[3-(2-phenyl)-(3-methylammonium)-2-imidazolinyl]ethyl} {(methylacryl amido)} dimethylammonium di(methylsulfate), N,N-bis(2-hydroxyethyl)aminomethyl amido, 2-(3-oxazolidinyl)ethyl ester, 2-{2-[methyl(2-pyrrolinyl)]3-oxazolidinyl}ethyl ester, 2-{12-imido-3,6,9-triazatetracyclo[12.3.1.0$^{2.6}$.0$^{9.13}$]octadeca-1(18),14,16-trien-3-yl}ethylamino methylamido, and the like. Preferred side chain groups of b) include 2-imidazolinylmethyl ester, amino-2-imidazolidinyl, N-2-[3-(2-phenyl)-2-imidazolinyl]ethylamino methylamido, {N-2-[3-(2-phenyl)-(3-methylammonium)-2-imidazolinyl]ethyl}{(methylacrylamido)}dimethylammonium di(methylsulfate), N,N-bis(2-hydroxyethyl) aminomethyl amido, 2-(3-oxazolidinyl)ethyl ester, 2-{2-[methyl(2-pyrrolinyl)]3-oxazolidinyl}ethyl ester, and 2-{12-imido-3,6,9-triazatetracyclo[12.3.1.0$^{2.6}$.0$^{9.13}$]octadeca-1(18),14,16-trien-3-yl}ethylamino methylamido groups.

In the polymer, the side chain groups having gas hydrate inhibition function are c), groups comprising an alkylamino ethoxylate or an alkylamino propoxylate. The alkylamino ethoxylate or propoxylate moiety is connected to the polymer backbone via an amide or ester bond, preferably via an amide bond; the group comprising an alkylamino ethoxylate or propoxylate is optionally and preferably terminated by an alkylamide group, preferably a methylamide group. The side chain group for gas hydrate inhibition has one to about six oxygen atoms, at least one amino group, and a total of about four to about fifteen non-hydrogen atoms. Examples of suitable side chain groups for gas hydrate inhibition include N-(5-methylamido-1,3-dioxapentamethylene)amino methylamide, and the like. Preferred side chain groups of c) include N-(5-methylamido-1,3-dioxapentamethylene)amino methylamido group.

Side chain groups which function as hydrogen sulfide scavengers in the polymers of the invention are d), groups comprising a trialkylhexahydrotriazine moiety. The trialkylhexahydrotriazine moiety can be connected to the polymer backbone via an amide or ester bond, preferably via an ester bond. The alkyl groups, which are attached to the nitrogen atoms of the hexahydrotriazine ring, can be the same or different, and are linear, branched, or cyclic, preferably cyclic; the cyclic groups can have substituents. The alkyl groups attached to the nitrogen atoms of the hexahydrotriazine ring have one to about twelve carbon atoms, preferably two to about eight carbon atoms. Alkyl groups that can be attached to the nitrogen atoms of the hexahydrotriazine ring include methyl, ethyl, n-propyl, isopropyl, n-butyl, sec-butyl, tert-butyl, pentyl, neopentyl, hexyl, cyclopentyl, cyclohexyl, methylcyclohexyl, and the like.

Thus, suitable side chain groups for scavenging hydrogen sulfide include, but are not limited to, 3-(hexahydro-3,5-dimethyl-1,3,5-triazinyl)propyl ester, 3-(hexahydro-3,5-diethyl-1,3,5-triazinyl)propyl ester, (hexahydro-3,5-di-n-propyl-1,3,5-triazinyl)methyl ester, 2-(hexahydro-3,5-di-isopropyl-1,3,5-triazinyl)ethyl ester, 3-(hexahydro-3,5-di-n-butyl-1,3,5-triazinyl)propyl ester, 2-(hexahydro-3,5-di-sec-butyl-1,3,5-triazinyl)ethyl ester, 2-(hexahydro-3,5-di-tert-butyl-1,3,5-triazinyl)ethyl ester, (hexahydro-3,5-dipentyl-1,3,5-triazinyl)methyl ester, 3-(hexahydro-3,5-di-neopentyl -1,3,5-triazinyl)propyl ester, 2-(hexahydro-3,5-dihexyl-1,3,5-triazinyl)ethyl ester, (hexahydro-3,5-dicyclopentyl-1,3,5-triazinyl)methyl ester, 2-(hexahydro-3,5-dicyclohexyl -1,3,5-triazinyl)ethyl ester, and 2-(hexahydro-3,5-dimethylcyclohexyl-1,3,5-triazinyl)ethyl ester. Preferred side chain groups of d) include 2-(hexahydro-3,5-dicyclohexyl-1,3,5-triazinyl)ethyl ester.

In the polymer, the side chain groups that function as paraffin inhibitors are e), groups comprising a fatty alkyl ester, which esters have a long chain alkyl group which is branched or linear, preferably linear, and has about sixteen to about thirty-six carbon atoms. Suitable side chain groups for paraffin inhibition include hexadecyl, heptadecyl, octadecyl, 14-ethyloctadecyl, nonadecyl, 3-methylnonadecyl, ecosyl (eicosyl), henicosyl, 17,17-dimethylhenicosyl, docosyl, tetracosyl, octacosyl, dotriacontyl, and hexatriacontyl esters, and the like. Mixtures of side chain groups having different chain lengths are recommended and preferred. Preferred side chain groups of e) include ecosyl (eicosyl), docosyl, and tetracosyl esters, and mixtures comprising one or more of these esters, especially a mixture of $C_{18}$, $C_{20}$, $C_{22}$, $C_{24}$, $C_{26}$, and $C_{28}$ esters.

The side chain groups in the polymers of the invention comprising both scale inhibition and corrosion inhibition functions are f), groups comprising (i) an ester of a polycarboxylic acid or polycarboxylate salt, an aminoalkylphosphate ester, or an ammoniumalkylphosphate ester, and (ii) an alkanolamino group, a fatty quaternary ammonium moiety, a heterocyclic ring moiety having at least five members and which ring has at least one nitrogen atom, or both a fatty quaternary ammonium moiety and a heterocyclic ring moiety having at least five members and which ring has at least one nitrogen atom. These side chain groups are bound to the polymer backbone via an ester or amide bond, preferably an ester bond.

Moieties (i) of this side chain group and the preferences therefor are as described for the esters of a polycarboxylic acid or polycarboxylate salt, aminoalkylphosphate esters, and ammoniumalkylphosphate esters in a) above. When (i) is an ester of a polycarboxylic acid or polycarboxylate salt, it is connected to either the polymer backbone or moiety (ii) via the ester bond. Similarly, when (i) is an aminoalkyl phosphate ester or a ammoniumalkyl phosphate ester, the aminoalkyl or ammoniumalkyl phosphate ester is connected to the polymer backbone or moiety (ii) via an amide or ester bond, preferably an ester bond.

Moieties (ii) of this side chain group and the preferences therefor are as described for the alkanolamino groups, fatty quaternary ammonium moieties, heterocyclic ring moieties, and groups comprising both a fatty quaternary ammonium moiety and a heterocyclic ring moiety in b) above. An amine bond, an amide bond, or an ester bond, preferably an amide bond or ester bond, and more preferably an ester bond, usually connects moiety (ii) to the polymer backbone or to moiety (i).

Preferred side chain groups of f) include those in which (i) is an ester of a polycarboxylic acid or polycarboxylate salt and (ii) is an imidazoline or a fatty quaternary ammonium moiety. A preferred side chain group f) is a 2-[(citratoyl) dimethylammonium chloride]ethyl ester group.

As stated above, the processes of this invention for preparing polymers comprise bringing together a free radical initiator and at least one monomer species to form a polymerization mixture, which polymerization mixture is heated to a temperature of at least about 60° C. to form a polymer. The monomer species is or are selected from at least one of the following: A) an acryloyl citrate ester or salt thereof, an acryloyl or acrylamido aminoalkylphosphate ester, or an acryloyl or acrylamido ammoniumalkylphosphate ester; B) an acryloyl alkanolamine, an acrylamido alkanolamine, an acryloyl fatty quaternary ammonium compound, an acrylamido fatty quaternary ammonium compound, an acryloyl or acrylamido compound comprising a heterocyclic ring moiety having at least five members and which ring has at least one nitrogen atom, or 4-vinylpyridine; C) an acryloyl alkylamino ethoxylate, an acryloyl alkylamino propoxylate, an acrylamido alkylamino ethoxylate, or an acrylamido alkylamino propoxylate; D) an acryloyl trialkylhexahydrotriazine or an acrylamido trialkylhexahydrotriazine; E) a fatty alkyl acrylate; and F) an acryloyl or acrylamido compound comprising (I) an acroylyl ester of a polycarboxylic acid or polycarboxylate salt, an aminoalkylphosphate ester, or an ammoniumalkylphosphate ester, and (II) an alkanolamino group, a fatty quaternary ammonium moiety, a heterocyclic ring moiety having at least five members, which ring has at least one nitrogen atom, said ring further comprising either unsaturation or at least one additional heteroatom, or both a fatty quaternary ammonium moiety and a heterocyclic ring moiety having at least five members, which ring has at least one nitrogen atom, said ring further comprising either unsaturation or at least one additional heteroatom. When forming the polymerization mixture, the free radical initiator is normally and preferably the last substance added to the polymerization mixture.

Without wishing to be bound by theory, it is believed that molecules of A) impart scale inhibitor properties to polymers formed therefrom, molecules of B) impart corrosion inhibitor properties to polymers formed therefrom, molecules of C) impart gas hydrate inhibitor properties to polymers formed therefrom, molecules of D) impart hydrogen sulfide scavenger properties to polymers formed therefrom, molecules of E) impart paraffin inhibitor properties to polymers formed therefrom, and molecules of F) impart both scale inhibitor and corrosion inhibitor properties to polymers formed therefrom.

In the bringing together of the monomer species and the free radical initiator, the monomer species can be already formed at the time of the bringing together, or the monomer species can be formed in the presence of the free radical initiator (i.e., the monomer species is made in situ). When there are two or more monomer species in the polymerization mixture, usually only one monomer species is made in situ.

Another way to form polymers of this invention is to bring together a free radical initiator; a vinylic compound selected from an acrylic acid (including acrylic acid, methacrylic acid, 2-ethylpropenoic acid), acrylamide, vinylamine, or vinyl formamide; and optionally at least one of monomer species of A), B), C), D), E), or F), to form a polymer-making mixture. The polymer-making mixture is heated to a temperature of at least about 60° C. to form a polymer. At least a portion of the polymer is brought together with one or more reagents suitable for forming a polymer having the desired side chain groups as described above for a), b), c), d), e), and/or f) on the polymer.

As described above, two different types of function can be present in one monomer species or polymer side chain group at least in situations where the monomer species has a tertiary amine that can be quaternized after polymerization (as only partial quaternization of the amine present in the polymer will occur). Thus, contacting a polymer with a quaternizing agent can form partially quaternized moieties in side chain groups having quaternizable amino groups. Suitable quaternizing agents include benzyl chloride, methyl chloride, and dimethyl sulfate.

Homopolymers are formed by the processes of this invention when only one monomer species of A), B), C), D), E), or F) is present in the polymerization mixture. For forming homopolymers, the monomer species is preferably A), B), C), or F). More preferably, the monomer species for forming homopolymers is A) or B).

Any combination of A), B), C), D), E), and/or F) can be brought together in a polymerization mixture in the processes of this invention. When only one monomer species is present in the polymerization mixture, the process produces homopolymers, as just described. Preferably, there are two or three different monomer species in a polymerization mixture. It is often preferred to have at least one monomer species from A) or at least one monomer species from B) in a polymerization mixture. In other preferred combinations, at least one monomer species from A) and at least one monomer species from B) are present in the polymerization mixture. Preferred combinations of monomer species in the polymerization mixture include two different monomer species of A); A) and B); A) and C); A) and D); A) and E); B) and C); three different monomer species of B); A), A), and B); A), B), and B); A), B), and C); and A), B), and D). More preferred combinations of monomer species include A) and B); A), B), and B); and A), B), and D). Particularly preferred combinations of monomer species include A) and B), since both are water soluble and perform well for their respective functions.

As stated above, one of the advantages of this invention is that one copolymer can contain more than one group, in sufficient amounts to meet all desired functions in one copolymer. Thus, in the processes of this invention, more than one monomer species can be included in the polymerization mixture. When two or more different monomer species are present in the polymerization mixture, the relative amount of any one monomer species to another monomer species can vary widely, e.g., from 0.1:1 to 1:0.1. However, in many instances, preferred ratios of one monomer species to another monomer species in a polymerization mixture are typically about 0.5:1 to about 1:0.5. As described above for side chain groups, those of skill in the art will appreciate that preferred relative amounts of the monomer species can vary widely, depending on the function(s), the particular monomer species for the function(s), the activity of the particular monomer species, and the intended use for the polymer.

As mentioned above, at least one free-radical initiator is employed in the polymerization process. Typical free radical initiators that can be used in the processes for preparing polymers include 2,2'-azoisobutyronitrile, 2,2'-azobis(2-methylbutyronitrile), 2,2'-azobis(2-methylpentanenitrile), azobiscyanovaleric acid, and the like. Preferred free radical initiators include azoisobutyronitrile, azobiscyanovaleric acid, or a combination thereof. The amount of free radical initiator in the processes of the invention is typically in the range of about 0.01 mole % to about 5 mole % relative to the total moles of monomer species brought together in the process. More preferably, amount of free radical initiator in the processes of the invention is typically in the range of about 0.02 mole % to about 1 mole % relative to the total moles of monomer species brought together in the process.

Temperatures for the polymerization processes of this invention usually range from about 60° C. to about 115° C. Preferably, the temperatures are in the range of about 70° C. to about 100° C. In a particularly preferred way of operating, the polymerization mixture is heated to a temperature of at least about 70° C. for the most of the polymerization reaction time (e.g., about 2 hours on the laboratory scale), and then heated to a higher temperature (e.g., 115° C.) for the remainder of the polymerization reaction time (e.g., about 15 minutes on the laboratory scale).

In the polymerization processes of this invention, the inclusion of a solvent is not always necessary, as some of the monomer species are liquid. For processes which include polar monomer species, polar solvents such as water and/or one or more alcohols can be employed. Suitable solvents include water, methanol, ethanol, n-propanol, isopropanol, and mixtures of two or more such solvents. Preferred polar solvents include water, isopropanol, and mixtures of water and isopropanol. For processes which include hydrocarbon monomer species, hydrocarbon solvents such as alkanes and aromatic solvents are preferred. Examples of hydrocarbon solvents that can be used include, but are not limited to, pentane, hexane, cyclohexane, heptane, octane, benzene, toluene, and xylene, and mixtures of two or more such solvents. Preferred hydrocarbon solvents include xylene.

The various monomer species used in the processes of this invention are vinylic compounds, which are molecules with a $CH_2=CH-$ group at one end. In the monomer species, the vinyl group is adjacent to a heteroatomic functional group which comprises nitrogen or oxygen, or both nitrogen and oxygen. More preferably, the functional group includes a carbonyl moiety. Preferred monomer species are acrylates, acrylamides, and vinylamines, especially acrylates and acrylamides. At least to some extent, the preference for an acrylate, an acrylamide, or a vinylamine as the monomer species is determined by the desired function of the monomer species. Some of the monomer species and some of the monomer syntheses are also embodiments of this invention.

In the syntheses of some of the monomer species, the reaction order can be of importance to avoid undesired reactions, e.g., esterification of a group not intended to be esterified, or addition to the vinylic bond.

The monomer species described below are compositions of this invention, and the methods for making these monomer species are embodiments of this invention.

Monomer species for scale inhibition, analogous to the side chain groups a) described above, are A), acryloyl esters of a polycarboxylic acid or polycarboxylate salt, acryloyl or acrylamido aminoalkylphosphate esters, and acryloyl or acrylamido ammoniumalkylphosphate esters. The polycarboxylate groups of the acryloyl ester are in the acid form, unless otherwise specified. Polycarboxylate salts of acryloyl polycarboxylate esters are salts of polycarboxylic acids having monovalent inorganic cations as the counterions. Examples of suitable cations include ammonium, or the alkali metal cations, including lithium, sodium, potassium, and the like. Preferred acryloyl polycarboxylate salts are ammonium salts and sodium salts. The acryloyl or acrylamido aminoalkyl phosphate esters preferably have one or two amino groups; similarly, the acryloyl or acrylamido ammoniumalkyl phosphate esters preferably have one or two ammonium groups. The aminoalkyl and ammoniumalkyl moieties of their respective phosphate esters preferably have about three to about twenty carbon atoms. The phosphate esters are in terminal positions of the aminoalkyl groups or ammoniumalkyl groups. Both the aminoalkyl and the ammoniumalkyl phosphate esters are connected to the polymer backbone via an amide or an ester bond. For an ammonium cation of an ammoniumalkyl moiety, the counterion is preferably a monovalent inorganic anion, such as a halide, including chloride, bromide, or iodide; chloride is preferred counterion.

Suitable scale inhibitor monomer species include, but are not limited to, acryloyl citrate, acryloyl triammonium citrate, acryloyl trilithium citrate, acryloyl trisodium citrate, acryloyl tripotassium citrate, acryloyl glutarate, acryloyl diammonium glutarate, acryloyl dilithium glutarate, acryloyl disodium glutarate, acryloyl dipotassium glutarate, N,N-di(methylphosphate)aminomethyl acrylamide, N,N-di(2-ethylphosphate)aminomethyl acrylamide, N,N-di(3-propylphosphate)aminomethyl acrylamide, 1,3-bis[N,N,N-tri(methylphosphatelammonium chloride]propyl acrylate, 1,3-bis[N,N,N-tri(2-ethylphosphate)ammonium chloride] propyl acrylate, and 1,3-bis[N,N,N-tri(3-propylphosphate) ammonium chloride]propyl acrylate. Preferred scale inhibitor monomer species include acryloyl citrate, acryloyl triammonium citrate, acryloyl trisodium citrate, N,N-di(2-ethylphosphate)aminomethyl amide, and 1,3-bis [N,N,N-tri (2-ethylphosphate)ammonium chloride]propyl ester. More preferred scale inhibitor monomer species include acryloyl citrate.

When the monomer species having scale inhibition function is an acryolyl ester of a polycarboxylic acid or polycarboxylate salt, it is formed by bringing together a polycarboxylic acid having a hydroxyl group and an acrylic reagent; if a salt of the polycarboxylate ester is desired, the polycarboxylate ester is formed, and then the acid form is converted to the desired salt form. Polycarboxylic acids having a hydroxyl group include citric acid and 3-hydroxyglutaric acid. Citric acid is a preferred polycarboxylic acid in the practice of this invention. Acrylic reagents for formation of citrate esters include acrylic acid, methacrylic acid, 2-ethylpropenoic acid, and acryloyl chloride; acrylic acid is preferred.

Scale inhibitor monomer species which are acryloyl or acrylamido aminoalkylphosphate esters or acryloyl or acrylamido ammoniumalkylphosphate esters are formed in at least two steps. In the first step, a dialkanolamine or a trialkanolamine is brought together with polyphosphoric acid, to form an alkylaminophosphate ester. The alkylaminophosphate ester is then brought together with an acrylic reagent and formaldehyde, forming the acryloyl or acrylamido aminoalkylphosphate ester. When the desired monomer species is an acryloyl or acrylamido ammoniumalkylphosphate ester, the alkylaminophosphate ester is brought together with an acrylic reagent and an epoxide having a haloalkyl substituent, forming the acryloyl or acrylamido ammoniumalkylphosphate ester. In these syntheses, the dialkanolamines and trialkanolamines have about one to about ten, preferably about one to about four, carbon atoms per alkanol group; the alkanol groups can be the same or different. Suitable dialkanolamines include, but are not limited to, dimethanolamine, diethanolamine, di-n-propanolamine, di-isopropanolamine, di-n-butanolamine, and di-sec-butanolamine; a preferred dialkanolamine is diethanolamine. Examples of trialkanolamines include trimethanolamine, triethanolamine, tri-n-propanolamine, tri-isopropanolamine, tri-n-butanolamine, tri-sec-butanolamine, and the like; a preferred trialkanolamine is triethanolamine. Acrylic reagents include acrylic acid, methacrylic acid, 2-ethylpropenoic acid, acryloyl chloride, acrylamide, and the like; acrylic acid and acrylamide are preferred acrylic reagents. The epoxide having a haloalkyl substituent has an alkyl substituent having one to about six carbon atoms, preferably one to about two carbon atoms, and the halogen atom is chlorine, bromine, or iodine, preferably chlorine. Suitable epoxides include 1- chloro-2,3-epoxypropane (epichlorohydrin), 1-bromo-2,3-epoxypropane (epibromohydrin), 1- iodo-2,3-epoxypropane (epiiodohydrin), 1-bromo-3,4-epoxybutane, 1-chloro-4,5-epoxypentane, and the like; a preferred epoxide is epichlorohydrin.

Corrosion inhibitor monomer species B), analogous to side chain groups b) described above, are an acryloyl or acrylamido alkanolamine, an acryloyl or acrylamido fatty quaternary ammonium compound, an acryloyl or acrylamido compound comprising a heterocyclic ring moiety, or a compound comprising both an acrylamido fatty quaternary ammonium moiety and a heterocyclic ring moiety. The heterocyclic ring moiety, whether alone or in combination with a fatty quaternary ammonium moiety, has at least five members, which ring has at least one nitrogen atom, and the ring further comprises either unsaturation or at least one additional heteroatom.

Acryloyl or acrylamido alkanolamines for the monomer species having corrosion inhibition function have one or two alkanol groups, preferably two alkanol groups. The alkanol groups of the alkanolamines have one to about twelve carbon atoms, preferably one to about four carbon atoms; examples of acryloyl or acrylamido alkanolamines include, but are not limited to, acrylamido methanolamine, acryloyl dimethanolamine, acryloyl ethanolamine, acrylamido diethanolamine, acrylamido n-propanolamine, acryloyl di-n-propanolamine, acryloyl isopropanolamine, acrylamido di-isopropanolamine, acrylamido n-butanolamine, acryloyl di-n-butanolamine, acryloyl sec-butanolamine, acrylamido di-sec-butanolamine, acrylamido pentanolamine, acryloyl dipentanolamine, acryloyl hexanolamine, and acrylamido dihexanolamine. Preferred acryloyl or acrylamido alkanolamines include acrylamido diethanolamine.

The acryloyl or acrylamido fatty quaternary ammonium compounds that are monomer species for corrosion inhibition have quaternary ammonium cations in which four alkyl groups are bound to the quaternary nitrogen atom. The alkyl groups can be the same or different, and are linear, branched, or cyclic, preferably linear. Each alkyl group independently has one to about thirty carbon atoms; one of the alkyl groups is bound to the acryloyl or acrylamido group. For the quaternary ammonium cation of a acryloyl or acrylamido fatty quaternary ammonium compound, the counterion is preferably a monovalent anion, including methylsulfate, ethylsulfate, propylsulfate, and the like; methylsulfate is a preferred counterion.

Corrosion inhibitor monomer species which are compounds comprising a heterocyclic ring moiety preferably have either one or two heterocyclic ring moieties. Each heterocyclic ring moiety preferably has five members or six members, more preferably five members. Preferably, the heterocyclic ring has one nitrogen atom, one nitrogen atom and one oxygen atom, or two nitrogen atoms as the ring heteroatoms. When there is only one heteroatom in the ring, the ring is unsaturated. Suitable heterocyclic ring moieties include pyridyl, pyrrolinyl, imidazolidinyl, 2-imidazolinyl, oxazolidinyl, and the like. Preferred heterocyclic ring moieties include pyridyl, pyrrolinyl, imidazolidinyl, 2-imidazolinyl, and oxazolidinyl. Preferred combinations for monomer species in which there are two heterocyclic ring moieties include pyrroline and oxazolidine; 2-imidazoline and oxazolidine; and imidazolidine and oxazolidine. At least one substituent, preferably one or two substituents, may be present on the heterocyclic ring, and a substituent can be bound to a heteroatom or to a carbon atom of the ring. When there is more than one substituent on the ring, it is preferred that one of the substituents is bound to a heteroatom, and any other substituents are bound to carbon atoms of the ring. When there are two substituents, it is preferred that one substituent is bound to a heteroatom, while the other substituent is bound to a carbon atom of the ring. Substituents on the heterocyclic ring include alkylamino groups; alkyl groups; and aryl groups, preferably a phenyl group. The heterocyclic ring moiety or moieties can be part of a polycyclic ring system, if desired.

When the monomer species for corrosion inhibition comprises both a fatty quaternary ammonium moiety and a heterocyclic ring moiety, the preferences for these moieties are as just described individually for the fatty quaternary ammonium compounds and the compounds comprising heterocyclic ring moieties. In these monomer species, a heterocyclic ring moiety can be a substituent on an alkyl group of the fatty quaternary ammonium moiety, or the quaternary ammonium cation can be a nitrogen atom of a heterocyclic ring.

Examples of suitable corrosion inhibitor monomer species include 2-imidazolinylmethyl acrylate, 2-imidazolidinyl vinylamine, N-2-[3-(2-phenyl)-2-imidazolinyl]ethylamino methyl acrylamide, {N-2-[3-(2-phenyl)-(3-methylammonium)-2-imidazolinyl]ethyl}{(methylacrylamide)}dimethylammonium di(methylsulfate), N,N-bis(2-hydroxyethyl)aminomethyl acrylamide, 2-(3-oxazolidinyl)ethyl acrylate, 2-{2-[methyl(2-pyrrolinyl)]3-oxazolidinyl}ethyl acrylate, 2-{12-imido-3,6,9-triazatetracyclo[12.3.1.0$^{2.6}$.0$^{9.13}$]octadeca-1(18),14,16-trien-3-yl}ethylamino methylamide, and the like. Preferred monomer species for corrosion inhibition include 2-imidazolinylmethyl acrylate, 2-imidazolidinyl vinylamine, N-2-[3-(2-phenyl)-2-imidazolinyl]ethylamino methyl acrylamide, {N-2-[3-(2-phenyl)-(3-methylammonium)-2-imidazolinyl]ethyl}{(methylacrylamide)}dimethylammonium di(methylsulfate), N,N-bis(2-hydroxyethyl)aminomethyl acrylamide, 2-(3-oxazolidinyl)ethyl acrylate, 2-{2-[methyl(2-pyrrolinyl)]3-oxazolidinyl}ethyl acrylate, and 2-{12-imido-3,6,9-triazatetracyclo[12.3.1.0$^{2.6}$.0$^{9.13}$]octadeca-1(18),14,16-trien-3-yl}ethylamino methylamide.

For forming monomer species, in many instances, it is recommended and preferred to proceed stepwise, forming a precursor molecule (such as an alcohol), which precursor is then reacted with a vinylic compound (e.g., acrylic acid, acrylamide, or vinylamine) to form the desired monomer species (e.g., an ester, acrylamide derivative, or vinylamine derivative). In some instances, the other reagents will not compete with the desired reaction with the vinylic compound, and all of the reagents to form the monomer species can be added in one step.

The monomer species for gas hydrate inhibition, as in the side chain groups for gas hydrate inhibition described above, are C), acryloyl or acrylamido alkylamino ethoxylates, or acryloyl or acrylamido alkylamino propoxylates, preferably acrylamido alkylamino ethoxylates or propoxylates. The alkylamino ethoxylate or propoxylate is optionally and preferably terminated by an alkylamide group, preferably a methylamide group. The monomer species for gas hydrate inhibition has one to about six oxygen atoms, at least one amino group, and about four to about fifteen non-hydrogen atoms. Suitable gas hydrate inhibitor monomer species include N-(5-methylamido-1,3-dioxapentamethylene)amino methylacrylamide, and the like. Preferred gas hydrate inhibitor monomer species include N-(5-methylamido-1,3-dioxapentamethylene)amino methylacrylamide.

Gas hydrate inhibitor monomer species are formed in two steps. In the first step, an alkyl anhydride and an ethoxylated or propoxylated alkylamine are brought together in the presence of a strong base to form an ethoxylated or propoxylated alkylamino alkylamide. In the second step, the ethoxylated or propoxylated alkylamino alkylamide is brought together with an acrylic reagent and optionally formaldehyde to form the acryloyl or acrylamido alkylamino ethoxylate or propoxylate. In these syntheses of gas hydrate inhibitor monomer species, acrylic reagents include acrylic acid, methacrylic acid, 2-ethylpropenoic acid, acryloyl chloride, acrylamide, and the like; acrylamide is a preferred acrylic reagent. Suitable alkyl anhydrides include acetic anhydride, propanoic anhydride, n-butanoic anhydride, sec-butanoic anhydride, and the like; acetic anhydride is a preferred alkyl anhydride. The ethoxylated or propoxylated alkylamine has one to about six oxygen atoms and at least one amino group. Examples of ethoxylated or propoxylated alkylamines that can be used include, but are not limited to triethanolamine, tripropanolamine, and triethylene glycol diamine; a preferred ethoxylated or propoxylated alkylamine is triethylene glycol diamine. The strong base is preferably an inorganic base, such as an alkali metal hydroxide, including lithium hydroxide, sodium hydroxide, potassium hydroxide; sodium hydroxide is a preferred base.

Monomer species for hydrogen sulfide scavenging, similar to the side chain groups described above for hydrogen sulfide scavenging, are D), acryloyl trialkylhexahydrotriazines or acrylamido trialkylhexahydrotriazines, more preferably acryloyl trialkylhexahydrotriazines. The alkyl groups, which are attached to the nitrogen atoms of the hexahydrotriazine ring, can be the same or different, and are linear, branched, or cyclic, preferably cyclic; the cyclic groups can have substituents. The alkyl groups attached to the nitrogen atoms of the hexahydrotriazine ring have one to about twelve carbon atoms, preferably two to about eight carbon atoms. Alkyl groups that can be attached to the nitrogen atoms of the hexahydrotriazine ring include methyl, ethyl, n-propyl, isopropyl, n-butyl, sec-butyl, tert-butyl, pentyl, neopentyl, hexyl, cyclopentyl, cyclohexyl, methylcyclohexyl, and the like.

Examples of hydrogen sulfide scavenger monomer species include, but are not limited to, 3-(hexahydro-3,5-dimethyl-1,3,5-triazinyl)propyl acrylate, 3-(hexahydro-3,5-diethyl-1,3,5-triazinyl)propyl acrylate, (hexahydro-3,5-di-n-propyl-1,3,5-triazinyl)methyl acrylate, 2-(hexahydro-3,5-di-isopropyl-1,3,5-triazinyl)ethyl acrylate, 3-(hexahydro-3,5-di-n-butyl-1,3,5-triazinyl)propyl acrylate, 2-(hexahydro-3,5-di-sec-butyl-1,3,5-triazinyl)ethyl acrylate, 2-(hexahydro-3,5-di-tert-butyl-1,3,5-triazinyl)ethyl acrylate, (hexahydro-3,5-dipentyl-1,3,5-triazinyl)methyl acrylate, 3-(hexahydro-3,5-di-neopentyl-1,3,5-triazinyl)propyl acrylate, 2-(hexahydro- 3,5-dihexyl-1,3,5-triazinyl)ethyl acrylate, (hexahydro-3,5-dicyclopentyl-1,3,5-triazinyl)methyl acrylate, 2-(hexahydro-3,5-dicyclohexyl-1,3,5-triazinyl)ethyl acrylate, and 2-(hexahydro-3,5-di-methylcyclohexyl-1,3,5-triazinyl)ethyl acrylate. Preferred monomer species of D) include 2-(hexahydro-3,5-dicyclohexyl-1,3,5-triazinyl)ethyl acrylate.

Monomer species having hydrogen sulfide scavenging function are formed in two steps. In the first step, a 1-alkanol-3,5-dialkylhexahydrotriazine can be formed by bringing together a monoalkylamine, a monoalkanolamine, and formaldehyde, most preferably in a molar ratio of about 2:1:3. In the second step, the 1-alkanol-3,5-dialkylhexahydrotriazine is brought together with an acrylic reagent to form the acryloyl trialkylhexahydrotriazine or acrylamido trialkylhexahydrotriazine. In the syntheses of hydrogen sulfide scavenging monomer species, acrylic reagents include acrylic acid, methacrylic acid, 2-ethylpropenoic acid, acryloyl chloride, acrylamide, and the like. Acrylic acid is a preferred acrylic reagent. The monoalkylamines have one to about twelve carbon atoms, preferably two to about eight carbon atoms. Suitable monoalkylamines are methylamine, ethylamine, n-propylamine, isopropylamine, n-butylamine, sec-butylamine, tert-butylamine, pentylamine, neopentylamine, hexylamine, cyclopentylamine, cyclohexylamine, methylcyclohexylamine, and the like. Preferred monoalkylamines include cyclohexylamine The monoalkanolamines have one to about twelve carbon atoms, preferably one to about four carbon atoms; examples of monoalkanolamines that can be used include, but are not limited to, methanolamine, ethanolamine, n-propanolamine, isopropanolamine, n-butanolamine, sec-butanolamine, pentanolamine, and hexanolamine. Preferred monoalkanolamines include ethanolamine.

For paraffin inhibition, the monomer species, analogous to the paraffin inhibitor side chain groups described above, are E), fatty alkyl acrylates, which acrylates have a long chain alkyl group which is branched or linear, preferably linear, and has about sixteen to about thirty-six carbon atoms. Suitable monomer species for paraffin inhibition include hexadecyl, heptadecyl, octadecyl, 14-ethyloctadecyl, nonadecyl, 3-methylnonadecyl, ecosyl (eicosyl), henicosyl, 17,17-dimethylhenicosyl, docosyl, tetracosyl, octacosyl, dotriacontyl, and hexatriacontyl acrylates, and the like. Mixtures of fatty alkyl acrylates having different chain lengths are recommended and preferred. Preferred fatty alkyl acrylates of E) include ecosyl (eicosyl), docosyl, and tetracosyl acrylates, and mixtures comprising one or more of these acrylates, especially a mixture of $C_{18}$, $C_{20}$, $C_{22}$, $C_{24}$, $C_{26}$, and $C_{28}$ esters.

Paraffin inhibitor monomer species are formed by bringing together a fatty alkyl alcohol and an acrylic reagent to form a fatty alkyl acrylate. Mixtures of two or more fatty alkyl alcohols can be used, and are preferred. The fatty alkyl alcohols have a long chain alkyl group which is branched or linear, preferably linear, and has about sixteen to about thirty-six carbon atoms. Suitable fatty alkyl alcohols include hexadecylol, heptadecylol, octadecylol, 14-ethyloctadecylol, nonadecylol, 3-methylnonadecylol, ecosol (eicosol), henicosol, 17,17-dimethylhenicosol, docosol, tetracosol, octacosol, dotriacontol, and hexatriacontol, and the like. Preferred fatty alkyl alcohols include ecosol (eicosol), docosol, and tetracosol, and mixtures comprising one or more of these alcohols, especially a mixture of $C_{18}$, $C_{20}$, $C_{22}$, $C_{24}$, $C_{26}$, and $C_{28}$ alcohols, which is available commercially as NAFOL® 22+, (Sasol Limited, Johannesburg, South Africa); the mixture contains $C_{18}$—OH (1.0% max.), $C_{20}$—OH (10.0% max.), $C_{22}$—OH (55.0±10%), $C_{24}$—OH (25.0±6%), $C_{26}$—OH (13.0±4%), and $C_{28}$—OH (9.0% max.), in which all percentages are by weight. In the syntheses of paraffin inhibitor monomer species, the acrylic reagent is acrylic acid, methacrylic acid, 2-ethylpropenoic acid, acryloyl chloride, and the like. Acrylic acid is a preferred acrylic reagent.

Monomer species comprising both scale inhibitor and corrosion inhibitor functions, like the side chain groups comprising both scale and corrosion inhibitor functions described above, are F), acryloyl or acrylamido compounds comprising (I) an acryolyl ester of a polycarboxylic acid or polycarboxylate salt, an aminoalkylphosphate ester, or an ammoniumalkylphosphate ester, and (II) an alkanolamino group, a fatty quaternary ammonium moiety, a heterocyclic ring moiety having at least five members, which ring has at least one nitrogen atom, said ring further comprising either unsaturation or at least one additional heteroatom, or both a fatty quaternary ammonium moiety and a heterocyclic ring moiety having at least five members, which ring has at least one nitrogen atom, said ring further comprising either unsaturation or at least one additional heteroatom. An advantage of a monomer species comprising both scale inhibitor and corrosion inhibitor functions is that it allows the introduction of two functions in a single homopolymer chain.

Moieties (I) of this monomer species and the preferences therefor are as described for the acryolyl esters of a polycarboxylic acid or polycarboxylate salt, acryloyl or acrylamido aminoalkylphosphate esters, and acryloyl or acrylamido ammoniumalkylphosphate esters in A) above. Moieties (II) of this side chain group and the preferences therefor are as described for the acryloyl or acrylamido alkanolamines, acryloyl or acrylamido fatty quaternary ammonium compounds, acryloyl or acrylamido compounds comprising a heterocyclic ring moiety, and compounds comprising both an acrylamido fatty quaternary ammonium moiety and a heterocyclic ring moiety in B) above. An amine bond, an amide bond, or an ester bond, preferably an amide bond or ester bond, and more preferably an ester bond, usually connects moiety (II) to moiety (I).

Preferred monomer species F) include those in which (I) is an acryloyl citrate or salt thereof and (II) is an imidazoline or a fatty quaternary ammonium moiety. A preferred monomer species F) is (acryloylethyl)(citratoyl)dimethylammonium chloride.

Monomer species comprising both scale and corrosion inhibitor functions can be formed in variouos ways. One method is via the cyclization of polyamines (diamines, triamines, etc.) with carboxylic compounds (e.g., carboxylic acids or acyl halides), followed by bringing together the cyclic polymaide formed with an acrylic reagent (acrylic acid, methacrylic acid, 2-ethylpropenoic acid, or acryloyl chloride), forming the desired monomer species. Another method is to bring together an alcohol-containing moiety such as a dialkanolamine or di(alkanol)-substituted imidazoline and citric acid or a salt thereof (optionally in the presence of a protonation agent, e.g., chloroacetic acid), followed by bringing together the alkanolamino citrate or alkanolimidazolino citrate (and/or the quaternary ammonium form of either of these, respectively) and an acrylic reagent (acrylic acid, methacrylic acid, 2-ethylpropenoic acid, or acryloyl chloride), forming the desired monomer species.

This invention provides, as stated above, methods for scale inhibition, corrosion inhibition, gas hydrate inhibition, hydrogen sulfide scavenging, and/or paraffin inhibition in a well, central treating area, or refinery, in which the improvement comprises including a polymer of this invention in the method.

The polymers of this invention can be used alone or can be blended with other components. If used alone, the polymers of the invention are typically dissolved in a suitable solvent to give a solution having about 20 wt % to about 40 wt % polymer. Most of the polymers are soluble in polar solvents such as alcohols. Suitable solvents include water, methanol, ethanol, n-propanol, isopropanol, n-butanol, and the like. Preferred solvents include water, isopropanol, and mixtures of water and isopropanol.

Other treatment chemicals that can be used with the polymers of this invention include viscosity reducers, emulsion breakers, non-polymeric corrosion inhibitors, scale inhibitors, gas hydrate inhibitors, hydrogen sulfide scavengers, and other additives used in the recovery of hydrocarbons from subterranean formations, and the refining thereof.

With respect to polymers for use as corrosion inhibitors, corrosion and scale inhibitors, gas hydrate inhibitors, and hydrogen sulfide inhibitors, the polymers of this invention are usually introduced into the well or central treating facility by injection. In these applications, the polymer may be injected in batch mode or continuously.

In a refinery, the polymers of this invention can be introduced to storage facilities, exits of de-salter units, and other feed points within the refinery. The polymers of this invention can be introduced to the refinery in batch mode or continuously, as appropriate.

The amount of the polymer of the invention used depends on the particular problem to be addressed, and the extent of the problem within a crude oil composition. Tests as described herein may be conducted in order to determine the optimum amount of polymer for a given purpose. For recovery of hydrocarbons from subterranean formations, typical amounts of polymer are in the range of about 50 ppm to about 800 ppm. For refinery operations, typical amounts of polymer are in the range of about 50 ppm to about 800 ppm. It is to be understood that deviations from these ranges are within the scope of the invention.

The following examples are presented for purposes of illustration, and are not intended to impose limitations on the scope of this invention.

EXAMPLE 1

Acrylamide (71 g), paraformaldehyde (30 g), water (36.5 g), and aqueous NaOH (50%, 3.92 g) were mixed together in a flask and then added to a dropping funnel. Diethanolamine (105 g) and hydroquinone methyl ether (MEHQ, 0.04 g) were charged to another flask. The solution in the dropping funnel was added dropwise to the flask containing the diethanolamine and MEHQ while air sparging. After the addition of the solution in the dropping funnel was complete, the combined mixture in the flask was allowed to sit at room temperature for 1.5 hours to form a monomer solution of N,N-bis(2-hydroxyethyl)aminomethyl acrylamide.

A portion (40 g) of the monomer solution just formed was transferred to another flask, nitrogen sparging was started, the solution was heated to 80 to 90° C., and azobiscyanovaleric acid (0.05 g) was added. Heating at 80 to 90° C. with nitrogen sparging continued for 8 hours.

EXAMPLE 2

To a flask were charged citric acid (96 g, 0.5 mol), $NH_4OH$ (176.17 g, 1.5 mol), acrylic acid (77 g, 1.07 mol), methanesulfonic acid (1 g), MeOH (82 g), and MEHQ (0.3 g). The solution was heated to reflux, and the methanol and water were distilled from the solution. A total of 241.6 g of water and methanol were distilled. Ammonium hydroxide (38.3 g) was added to the remaining undistilled solution in the flask to bring the pH to 7. The monomer formed is acryloyl triammonium citrate.

To another flask was charged triethanolamine (49.7 g), epichlorohydrin (25 g), acrylic acid (12.88 g), and MEHQ (0.1 g). While stirring, polyphosphoric acid (100 g) was added to the solution; at the same time the flask was cooled to keep the temperature under 120° C. After all of the polyphosphoric acid had been added, air sparging was started and the solution was heated to reflux to remove condensation water. The monomer formed is acryloyl triethanolamine triphosphate ester.

A portion (31.9 g) of the acryloyl triammonium citrate just formed and a portion (20 g) of the acryloyl triethanolamine triphosphate ester just formed were transferred to another flask. The solution was heated on an oil bath, a nitrogen sparge was started, azobiscyanovaleric acid (0.1 g) was added to the solution, and the solution was heated, keeping the temperature below 100° C., for 8 hours.

EXAMPLE 3

Water (53 g) and triethylene glycol diamine (74 g) were charged to a flask. Acetic anhydride (51 g) was charged to a dropping funnel, and added dropwise to the triethylene glycol diamine/water mixture over 1.25 hours. Then aqueous NaOH (50%, 40 g) was added to the flask (to neutralize the amine acetate), and the contents of the flask were allowed to cool. In a separate flask, acrylamide (35.5 g), formaldehyde (37%, 40.5 g), and water (39.5 g) were mixed together, and this mixture was added to the cooled neutralized solution. The monomer formed is N-(5-methylamido-1,3-dioxapentamethylene)amino methylacrylamide.

To another flask were charged benzoic acid (122 g) and diethylenetriamine (103 g). This mixture was heated at 200 to 230° C. for a period of time, after which a vacuum was applied to remove water produced during the reaction. Acrylamide (72 g), paraformaldehyde (30 g), water (127 g), aqueous NaOH (50%, 0.4 g), and MEHQ (0.03 g) were mixed together in a flask and then added to the benzoic acid/diethylenetriamine product solution. The combined mixture was stirred at room temperature for 2 to 4 hours. The monomer formed is N-2-[3-(2-phenyl)-2-imidazolinyl]ethylamino methyl acrylamide.

A portion (40 g) of the N-(5-methylamido-1,3-dioxapentamethylene)amino methylacrylamide just formed and a portion (51.6 g) of the N-2-[3-(2-phenyl)-2-imidazolinyl]ethylamino methyl acrylamide just formed were transferred to another flask. The solution was heated on an oil bath, a nitrogen sparge was started, azobiscyanovaleric acid was added to the solution, and the solution was heated at 80 to 90° C. for 8 hours.

EXAMPLE 4

To a flask were charged citric acid (96 g, 0.5 mol), acrylic acid (55.4 g), xylene (100 g), NaOH (aq., 50%, 50 g), methanesulfonic acid (1.10 g), $BF_3.OEt_2$ (0.8 g), MEHQ (0.17 g), and a $C_{18}$-$C_{28}$ mixture of linear alcohols (60 g; NAFOL® 22+, Sasol Limited, Johannesburg, South Africa). The solution was heated and refluxed, and the water was removed from the solution as its azeotrope with xylene. The monomers formed are acryloyl citrate and a mixture of $C_{18}$-$C_{28}$ acrylates.

The solution of monomers just formed was heated on an oil bath, a nitrogen sparge was started, azobiscyanovaleric acid was added to the solution, and the solution was heated at 80 to 90° C. for 8 hours.

EXAMPLE 5

To a flask were charged tetraethylenepentamine (90.5 g) and isophthalic acid (82 g). Acrylamide (35.5 g) and formaldehyde (37%, 40.5 g) were mixed together in a separate flask, and then the acrylamide/formaldehyde mixture was added to the flask containing the tetraethylenepentamine/isophthalic acid mixture via a dropping funnel. The monomer formed is 2-{12-imido-3,6,9-triazatetracyclo [12.3.1.0$^{2,6}$0$^{9,13}$]octadeca-1(18),14,16-trien-3-yl}ethylamino methylamide.

To a flask were charged paraformaldehyde (30 g) and diethanolamine (105 g). The mixture was refluxed at 144° C. to remove water of condensation. After the reaction was complete, the contents of the flask were cooled to 65° C. Acrylic acid (74 g), xylene (40 g), methanesulfonic acid (0.2 g), and MEHQ (0.08 g) were then added to the flask, and this mixture was refluxed at 125-130° C. to remove water of condensation. The monomer formed is 2-(3-oxazolidinyl)ethyl acrylate.

A portion (21.67 of the 2-{12-imido-3,6,9-triazatetracyclo [12.3.1.0$^{2,6}$.0$^{9,13}$]octadeca-1(18),14,16-trien-3-yl}ethylamino methylamide just formed, a portion (8.46 g) of the 2-(3-oxazolidinyl)ethyl acrylate just formed, and 20 g of N-2-[3-(2-phenyl)-2-imidazolinyl]ethylamino methyl acrylamide made as described in Example 3 were combined in another flask. The solution was heated on an oil bath, a nitrogen sparge was started, azobiscyanovaleric acid was added to the solution, and the solution was heated at 80 to 90° C. for 8 hours.

EXAMPLE 6

To a flask were charged glycolic acid (76.5 g) and ethylenediamine (109.1 g). The mixture was refluxed to remove water of condensation. After the reaction was complete, the contents of the flask were cooled, and methanesulfonic acid (2 g), methanol (59.7 g), xylene (100 g), and MEHQ (0.05 g) were added to the flask, and this mixture was refluxed at 125-130° C. to remove water of condensation. The monomer formed is 2-imidazolinylmethyl acrylate.

To a flask were charged citric acid (96 g), hexane (90 g), MEHQ (0.05 g), and acetone (113.6 g). Acryloyl chloride (45.25 g) was placed in a dropping funnel, and added to the mixture in the flask while heating the flask at 60° C. After the addition was complete, hexane and acetone were boiled away, and water (60 g) was added to the flask. The monomer formed is acryloyl citrate.

A portion (50 g) of the acryloyl citrate just formed, a portion (25.9 g) of the 2-imidazolinylmethyl acrylate just formed, and 25 g of N-2-[3-(2-phenyl)-2-imidazolinyl]ethylamino methyl acrylamide made as described in Example 3 were combined in another flask. The solution was heated on an oil bath, a nitrogen sparge was started, azobiscyanovaleric acid was added to the solution, and the solution was heated at 80 to 90° C. for 8 hours.

EXAMPLE 7

To a flask were added paraformaldehyde (30 g), diethanolamine (105 g), and NaOH (50%, 0.4 g). The mixture was heated to reflux (125-130° C.) to remove water of reaction; N-(2-hydroxyethyl)oxazolidine was formed. In a separate flask, glycolic acid (76.05 g) and ethylenediamine (85%, 109.09 g) were combined, forming 2-(2-hydroxyethyl)-2-imidazoline. To another flask were added a portion (53.57 g) of the N-(2-hydroxyethyl)oxazolidine just formed and a portion (61 g) of the 2-(2-hydroxyethyl)-2-imidazoline just formed. Air sparging was started, and acrylic acid (32 g), methanol (17.4 g), BF$_3$.OEt$_2$ (10 drops), and MEHQ (0.2 g) were added to the mixture. The monomer formed was 2-{2-[methyl(2-pyrrolinyl)]3-oxazolidinyl}ethyl acrylate.

To a flask were charged cyclohexylamine (66 g), ethanolamine (85%, 23.5 g), and formaldehyde (37%, 81 g). The mixture was heated to distill water of reaction as it was produced, and then the mixture was cooled to room temperature. Acrylic acid (29 g), methanesulfonic acid (0.2 g), and MEHQ (0.05 g) were then added to the flask. This mixture was heated to 130° C. (max.) to remove water of reaction. The monomer formed is 2-(hexahydro-3,5-dicyclohexyl-1,3,5-triazinyl)ethyl acrylate.

Acryloyl citrate was made as described in Example 4, except that the C$_{18}$-C$_{28}$ mixture of linear alcohols was not present.

A portion (30.37 g) of the 2-{2-[methyl(2-pyrrolinyl)]3-oxazolidinyl}ethyl acrylate just formed, a portion (30.1 g) of the 2-(hexahydro-3,5-dicyclohexyl-1,3,5-triazinyl)ethyl acrylate just formed, and 32.3 g of acryloyl citrate made as just described were combined in another flask, along with water (30.77 g) and NH$_4$OH (aq., 29%, 7.48 g). The solution was heated on an oil bath, a nitrogen sparge was started, azobiscyanovaleric acid was added to the solution, and the solution was heated at 80 to 90° C. for 8 hours.

EXAMPLE 8

To a flask were added chloroacetic acid (23.5 g), citric acid (48 g), methanesulfonic acid (0.5 g), and MEHQ (0.04 g). N,N-dimethylethanolamine (22.25 g) was placed in a dropping funnel and added dropwise to the mixture in the flask. After the addition of the N,N-dimethylethanolamine was complete, the mixture was heated to 70-90° C., and kept at 70-90° C. for 1.5 hours. While keeping the temperature of the mixture at 70-90° C., acrylic acid (18 g) was added. The mixture in the flask was heated to reflux (maximum 125° C.) to remove water of reaction. The monomer formed is (acryloylethyl) citratoyl dimethylammonium chloride.

A portion (70.85 g) of the (acryloylethyl) citratoyl dimethylammonium chloride just formed and water (70.85 g) were charged to another flask. The solution was heated on an oil bath, a nitrogen sparge was started, azobiscyanovaleric acid (0.2 g) was added to the solution, and the solution was heated, keeping the temperature below 100° C., for 8 hours.

A portion (22.5 g) of the polymer just formed and NH$_4$OH (12 g) were transferred to another flask. This solution was heated on an oil bath, a nitrogen sparge was started, and the solution was heated, keeping the temperature below 100° C., for 8 hours, converting the citrate groups to their triammonium salts.

EXAMPLE 9

To a flask were charged acryloyl citrate (50.13 g) made as described in Example 7, and water (34.72 g). Aqueous NaOH (50%, 34.72 g) was added to the flask while cooling the flask, forming acryloyl trisodium citrate.

EXAMPLE 10

Diethanolamine (115 g) was charged to a flask. While stirring and cooling, polyphosphoric acid (209 g) was added to the diethanolamine. After the addition of polyphosphoric acid was complete, the mixture was cooled to room temperature, and then water (50 g) was added to the mixture. In a separate flask, acrylamide (72 g), paraformaldehyde (30 g), NaOH(50%, 52 g), water (52 g), and MEHQ (0.04 g) were mixed together, and then this mixture was placed in a dropping funnel and added to the flask to which the polyphosphoric acid had been added. The monomer formed was N,N-di(2-ethylphosphate)aminomethyl acrylamide.

EXAMPLE 11

Vinyl formamide (35.5 g) and ethylenediamine (54.5 g) were mixed together in a flask and the mixture was heated. The monomer formed was 2-imidazolidinyl vinylamine.

EXAMPLE 12

To a flask was added 160 g of #45 made as described in Example 3. Aqueous NaOH (50%, 57.6 g) was then added to the flask, followed by a dropwise addition of dimethyl sulfate (90.7 g). The monomer formed was {N-2-[3-(2-phenyl)-(3-methylammonium)-2-imidazolinyl]ethyl}{(methylacrylamido)}dimethylammonium di(methylsulfate).

EXAMPLE 13

Acryloyl trisodium citrate made as described in Example 9 (20.2 g), vinylformamide (30 g), and water (40 g) were added to a flask and mixed together. The mixture was then heated on an oil bath, a nitrogen sparge was started, azobiscyanovaleric acid was added to the solution, and the solution was heated at 80 to 90° C. for 8 hours. A portion (80 g) of the polymer formed was mixed with diethylenetriamine (44.1 g) and water (168 g), and this mixture was stirred for 4 hours at room temperature.

TABLE 1

| Monomer function | Ex. | Monomer code | Chemical name |
|---|---|---|---|
| scale inhibitor | 4, 6, 7 | A1 | acryloyl citrate |
| | 2 | A2 | acryloyl triammonium citrate |
| | 2 | A3 | 1,3-bis[N,N,N-tri(2-ethylphosphate)ammonium chloride]propyl acrylate |
| | 9 | A4 | acryloyl trisodium citrate |
| | 10 | A5 | N,N-di(2-ethylphosphate)aminomethyl acrylamide |
| corrosion inhibitor | 6 | B1 | 2-imidazolinylmethyl acrylate |
| | 5 | B2 | 2-{12-imido-3,6,9-triazatetracyclo[12.3.1.0$^{2,6}$.0$^{9,13}$]octadeca-1(18),14,16-trien-3-yl}ethylamino methylamide |
| | 11 | B3 | 2-imidazolidinyl vinylamine |
| | 3, 5, 6 | B4 | N-2-[3-(2-phenyl)-2-imidazolinyl]ethylamino methyl acrylamide |
| | 12 | B5 | {N-2-[3-(2-phenyl)-(3-methylammonium)-2-imidazolinyl]ethyl}{(methylacrylamide)}dimethylammonium di(methylsulfate) |
| | 1 | B6 | N,N-bis(2-hydroxyethyl)aminomethyl acrylamide |
| | 5 | B7 | 2-(3-oxazolidinyl)ethyl acrylate |
| | 7 | B8 | 2-{2-[methyl(2-pyrrolinyl)]3-oxazolidinyl}ethyl acrylate |
| gas hydrate inhibitor | 3 | C1 | N-(5-methylamido-1,3-dioxapentamethylene)amino methylacrylamide |
| H$_2$S scavenger | 7 | D1 | 2-(hexahydro-3,5-dicyclohexyl-1,3,5-triazinyl)ethyl acrylate |
| paraffin inhibitor | — | E1 | C$_{18}$-C$_{28}$ mixture of linear alcohols* |
| scale + corrosion inhibitor | 8 | F1 | (acryloylethyl)(citratoyl)dimethylammonium chloride |

*NAFOL ® 22$^+$ (Sasol Limited, Johannesburg, South Africa): mixture contains C$_{18}$—OH (1.0% max.), C$_{20}$—OH (10.0% max.), C$_{22}$—OH (55.0 ± 10%), C$_{24}$—OH (25.0 ± 6%), C$_{26}$—OH (13.0 ± 4%), and C$_{28}$—OH (9.0% max.); all percentages are by weight.

In Table 2, where a number appears in the column labeled "Ex.", the table entry refers to the corresponding numbered Example above. Experiments for the table entries without Example numbers were conducted in a manner similar to those in the above Examples.

TABLE 2

| Ex. | Monomer species | Other ingredients | Conditions |
|---|---|---|---|
| | 100 g A3 | 100 g water | N$_2$ sparge, oil bath, max. 100° C., 8 hrs. |
| | | 0.04 g azobiscyanovaleric acid | |
| | (A1)$^a$ | 72.8 g xylene | N$_2$ sparge, 80-90° C., 8 hrs.$^b$ |
| | 192 g citric acid | 0.08 g MEHQ | |
| | 79 g acrylic acid | 40 g MeOH | |
| 1 | 40 g B6 | 0.05 g azobiscyanovaleric acid | N$_2$ sparge, 80-90° C., 8 hrs. |
| | 200 g B2 | 0.3 g azobiscyanovaleric acid | N$_2$ sparge, oil bath, max. 100° C., 8 hrs. |
| | 71.84 g B5 | 30.7 g water | N$_2$ sparge, 80-90° C., 8 hrs. |
| | | 0.05 g azobiscyanovaleric acid | |
| | 100 g C1 | 0.2 g azobiscyanovaleric acid | N$_2$ sparge, oil bath, max. 100° C., 8 hrs. |
| 2 | 31.9 g A2 | 0.1 g azobiscyanovaleric acid | N$_2$ sparge, oil bath, max. 100° C., |
| | 20 g A3 | | |
| 5 | 21.67 g B2 | azobiscyanovaleric acid | N$_2$ sparge, 80-90° C., 8 hrs. |
| | 20 g B4 | | |
| | 8.46 g B7 | | |
| | 100 g A2 | 0.04 g azobiscyanovaleric acid | N$_2$ sparge, oil bath, max. 100° C., 8 hrs. |
| | 100 g B1 | | |
| | 25 g A1 | 50 g water | N$_2$ sparge, 80-90° C., 8 hrs. |
| | 16 g B8 | 0.2 g azobiscyanovaleric acid | |
| | 51 g A1 | 78 g water | N$_2$ sparge, 80-90° C., 8 hrs. |
| | 51 g B7 | 43 g NH$_4$OH (aq., 29%) | |

TABLE 2-continued

| Ex. | Monomer species | Other ingredients | Conditions |
|---|---|---|---|
| | 40 g A2<br>24 g B3 | 0.2 g azobiscyanovaleric acid<br>14.93 g NH$_4$OH (aq., 29%)<br>0.1 g azobiscyanovaleric acid | N$_2$ sparge, 80-90° C., 8 hrs. |
| | 36.75 g A3<br>36.54 g B3 | 42.4 g water<br>0.08 g azobiscyanovaleric acid | N$_2$ sparge, 80-90° C., 8 hrs. |
| | 30 g A1<br>30 g B5 | 33.5 g water<br>0.05 g azobiscyanovaleric acid | N$_2$ sparge, 80-90° C., 8 hrs. |
| 13 | 80 g polymer (A4 + vinylformamide)<br>44.1 g diethylenetriamine[c] | 168 g water<br>0.1 g azobiscyanovaleric acid | N$_2$ sparge, 80-90° C., 8 hrs.[c] |
| | 20.7 g A1<br>23.5 g 4-vinylpyridine | 20.22 g isopropanol<br>37 g water<br>0.05 g azobiscyanovaleric acid | N$_2$ sparge, 80-90° C., 8 hrs. |
| | 76.3 g A5<br>25 g B4 | 25 g water<br>0.05 g azobiscyanovaleric acid | N$_2$ sparge, 80-90° C., 8 hrs. |
| | 31.89 g A4<br>25 g B4<br>20.57 g B6 | 0.1 g azobiscyanovaleric acid | N$_2$ sparge, 80-90° C., 8 hrs. |
| 6 | 50 g A1<br>25.9 g B1<br>25 g B4 | 0.1 g azobiscyanovaleric acid | N$_2$ sparge, 80-90° C., 8 hrs. |
| | 109.5 g A5<br>109.79 g B1<br>54.62 g B2 | 23 g NH$_4$OH<br>27.29 g dimethyl sulfate<br>0.1 g azobiscyanovaleric acid | N$_2$ sparge, 90-100° C., 8 hrs.[d] |
| | 25 g A2<br>25 g A3<br>25 g B1 | 0.1 g azobiscyanovaleric acid | N$_2$ sparge, oil bath, max. 100° C., 8 hrs. |
| | 30 g A1<br>30 g A3<br>90 g B7 | 0.1 g azobiscyanovaleric acid | N$_2$ sparge, 80-90° C., 8 hrs. |
| | 50 g A2<br>30 g D1 | 81 g isopropanol<br>35 g water<br>0.1 g azobiscyanovaleric acid | N$_2$ sparge, oil bath, max. 100° C., 8 hrs. |
| | 25 g A2<br>25 g C1 | 0.2 g azobiscyanovaleric acid | N$_2$ sparge, oil bath, max. 100° C., 8 hrs. |
| | 25.13 g A1<br>40 g C1 | 23.3 g water<br>14.49 g NH$_4$OH (aq., 29.8%)<br>0.2 g azobiscyanovaleric acid | N$_2$ sparge, 80-90° C., 8 hrs. |
| 3 | 51.6 g B4<br>40 g C1 | 0.1 g azobiscyanovaleric acid | N$_2$ sparge, 80-90° C., 8 hrs. |
| 4 | (A1)[e]<br>96 g citric acid<br>55.4 g acrylic acid<br>1.10 g methanesulfonic acid<br>0.8 g BF$_3$•OEt$_2$<br>60 g E1 | 100 g xylene<br>0.17 g MEHQ<br>50 g NaOH (aq., 50%)<br>0.1 g azobiscyanovaleric acid | N$_2$ sparge, 80-90° C., 8 hrs.[e] |
| 7 | 32.3 g A1<br>30.37 g B8<br>30.1 g D1 | 7.48 g NH$_4$OH (aq., 29%)<br>30.77 g water<br>0.1 g azobiscyanovaleric acid | N$_2$ sparge, 80-90° C., 8 hrs. |
| | 20.42 g A2<br>19.48 g B1<br>17.2 g D1 | isopropanol<br>0.1 g azobiscyanovaleric acid | N$_2$ sparge, oil bath, max. 100° C., 8 hrs. |
| | 20 g A2<br>20 g B1<br>20 g D1 | 0.1 g azobiscyanovaleric acid | N$_2$ sparge, oil bath, max. 100° C., 8 hrs. |
| | 25 g A3<br>25 g B2<br>25 g C1 | 0.2 g azobiscyanovaleric acid | N$_2$ sparge, oil bath, max. 100° C., 8 hrs. |
| 8 | 70.85 g F1 | 70.85 g water<br>0.2 g azobiscyanovaleric acid | N$_2$ sparge, oil bath, max. 100° C. |
| 8 | 22.5 g polymer from F1 | 12 g NH$_4$OH | N$_2$ sparge, oil bath, max. 100° C., 8 hrs. |

[a]Monomer was made in situ; all ingredients (except the azobiscyanovaleric acid) were added to a flask, then started N$_2$ sparge, 80-90° C., added azobiscyanovaleric acid, 8 hrs.
[b]For all experiments described as "N$_2$ sparge, 80-90° C., 8 hrs.", the azobiscyanovaleric acid was added after the mixture reached 80-90° C.
[c]Diethylenetriamine reacts with the already-formed polymer; see Example 13 for full details.
[d]A5 and dimethyl sulfate were heated together at 100° C. for one hour while air sparging, then added all remaining ingredients (except azobiscyanovaleric acid), then started N$_2$ sparge, 90-100° C., added azobiscyanovaleric acid, 8 hrs.
[e]See Example 4 for full details: mixed all ingredients except the azobiscyanovaleric acid and refluxed; when esterification was complete, the polymerization was started.

The combinations of types of monomer species shown in Table 2, and the particular polymers produced therefrom, constitute embodiments of the present invention. In addition, the above combinations will suggest further permutations and/or combinations, which permutations and/or combinations are within the scope of this invention.

Several of the polymers made above (see Table 2) were tested. In the test, type 316 stainless steel was exposed to aqueous HCl (15 M) at 180° F. (82° C.) for 2 hours in the presence of an amount of the polymer being tested. The ratio of remaining steel to dissolved steel was measured, and is reported as percentage protection. Results of these tests are summarized in Table 3. Although the tests were carried out on polymers, the monomer species used in forming the polymers are listed for easy correlation with the polymer syntheses above in Table 2.

TABLE 3

| Monomer species | Polymer conc. | Protection |
|---|---|---|
| A3 | 500 ppm | 80.96% |
| B6 | 500 ppm | 73.24% |
| B2 | 500 ppm | 84.85% |
| B5 | 500 ppm | 82.81% |
| A2/A3 | 500 ppm | 78.81% |
| B2/B4/B7 | 500 ppm | 74.59% |
| A2/B1 | 500 ppm | 83.28% |
| A1/B7 | 500 ppm | 80.82% |
| A2/B3 | 500 ppm | 80.28% |
| A3/B3 | 500 ppm | 83.9% |
| A1/B5 | 500 ppm | 85.47% |
| A4/vinyl formamide | 500 ppm | 92.00% |
| A4/B4/B6 | 500 ppm | 82.96% |
| A1/B1/B4 | 500 ppm | 76.70% |
| A2/A3/B1 | 500 ppm | 80.96% |
| A2/D1 | 200 ppm | 84.16% |
| B4/C1 | 500 ppm | 84.17% |
| A1/B8/D1 | 500 ppm | 80.96% |
| A2/B1/D1 | 200 ppm | 79.71% |
| A2/B1/D1 | 500 ppm | 83.28% |

Two of the above polymers, the one formed from A2/A3 and the one formed from A2/B1, were subjected to a scale inhibition test at polymer concentrations of about 5 to 7 ppm. Results of the scale inhibition tests were considered to be very good.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition.

The invention may comprise, consist, or consist essentially of the materials and/or procedures recited herein.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

Each and every patent or other publication or published document referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented hereinabove.

That which is claimed is:

1. A polymer having side chain groups comprising at least one of the following:
    a) a group comprising a citrate ester in acid form, triammonium citrate ester, trisodium citrate ester, an aminoalkylphosphate ester, or an ammoniumalkylphosphate ester;
    b) a group comprising an alkanolamino group, a fatty quaternary ammonium moiety, a heterocyclic ring moiety in which the ring is a pyridyl, pyrrolinyl, imidazolidinyl, 2-imidazolinyl, or oxazolidinyl moiety, or both a fatty quaternary ammonium moiety and a heterocyclic ring moiety having at least five members, which ring has at least one nitrogen atom, said ring further comprising either unsaturation or at least one additional heteroatom;
    c) a group comprising an alkylamino ethoxylate or an alkylamino propoxylate;
    d) a group comprising a trialkylhexahydrotriazine moiety;
    e) a group comprising a fatty alkyl ester; or
    f) a group comprising (i) an ester of a polycarboxylic acid or polycarboxylate salt, an aminoalkylphosphate ester, or an ammoniumalkylphosphate ester, and (ii) a group comprising an alkanolamino group, a fatty quaternary ammonium moiety, a heterocyclic ring moiety having at least five members, which ring has at least one nitrogen atom, said ring further comprising either unsaturation or at least one additional heteroatom, or both a fatty quaternary ammonium moiety and a heterocyclic ring moiety having at least five members, which ring has at least one nitrogen atom, said ring further comprising either unsaturation or at least one additional heteroatom.

2. A polymer as in claim 1 wherein said polymer is
a homopolymer which has side chain groups selected from a); b); c); or f); or
a bipolymer which has side chain groups selected from two different groups of a); a) and b); a) and c); a) and d); a) and e); b) and c); or
a terpolymer which has side chain groups selected from three different groups of b); two different groups of a) and one group of b); one group of a) and two different groups of b); a), b), and c); or a), b), and d).

3. A polymer as in claim 1 wherein said side chain groups are b); a) and b); one group of a) and two different groups of b); or a), b), and d).

4. A polymer as in any of claims 1-3 wherein
said group a) is a citrate ester in acid form, triammonium citrate ester, trisodium citrate ester, N,N-di(2-ethylphosphate)aminomethyl amide, or 1,3-bis[N,N,N-tri(2-ethylphosphate)ammonium chloride]propyl ester group; and/or
said group b) is a 2-imidazolinylmethyl ester, amino-2-imidazolidinyl, N-2-[3-(2-phenyl)-2-imidazolinyl] lethylamino methylamido, {N-2-[3-(2-phenyl)-(3-methylammonium)-2-imidazolinyl]lethyl}{(methylacrylamido)}dimethylammonium di(methylsulfate), N,N-bis(2-hydroxyethyl)aminomethyl amido, 2-(3-oxazolidinyl)ethyl ester, 2-{2-[methyl(2-pyrrolinyl)]3-oxazolidinyl}ethyl ester, or 2-{12- imido-3,6,9-triazatetracyclo[12.3.1.0$^{2,6}$.0$^{9,13}$]octadeca-1(18),14,16-trien-3-yl}ethylamino methylamido group; and/or said group c) is a N-(5-methylamido-1,3-dioxapentamethylene)amino methylamido group; and/or said group d) is a 2-(hexahydro-3,5-dicyclohexyl-1,3,5-triazinyl)ethyl ester group; and/or said groups e) are a mixture of groups having different chain lengths; and/or said group f) is a 2-[(citratoyl)dimethylammonium chloride]ethyl ester group.

5. A polymer as in claim 1 wherein said group a) is a citrate ester; and/or said group b) comprises a heterocyclic ring moiety; and/or said group d) is a trialkylhexahydrotriazine moiety having alkyl groups, which alkyl groups have two to about eight carbon atoms; and/or said group e) is an eicosyl, docosyl, or tetracosyl ester, or a mixture comprising one or more of these; and/or said group f) comprises (i) a citrate ester or salt thereof and (ii) a fatty quaternary ammonium moiety.

6. A polymer as in claim 1 wherein said group b) comprises a heterocyclic ring moiety in which the ring is a pyridyl, pyrrolinyl, imidazolidinyl, 2-imidazolinyl, or oxazolidinyl moiety; and/or said group f) comprises (i) a citrate ester or triammonium citrate ester and (ii) a fatty quaternary ammonium moiety.

7. A process for preparing polymers of claim 1, which process comprises 1) bringing together at least one free radical initiator; a vinyl compound selected from an acrylic acid, acrylamide, vinylamine, or vinyl formamide; and optionally comprising at least one of the following:

A) an acryloyl ester of a polycarboxylic acid or polycarboxylate salt, an acryloyl or acrylamido aminoalkylphosphate ester, or an acryloyl or acrylamido ammoniumalkylphosphate ester;

B) an acryloyl alkanolamine, an acrylamido alkanolamine, an acryloyl fatty quaternary ammonium compound, an acrylamido fatty quaternary ammonium compound, an acryloyl or acrylamido compound comprising a heterocyclic ring moiety in which the ring is a pyridyl, pyrrolinyl, imidazolidinyl, 2-imidazolinyl, or oxazolidinyl moiety, a compound comprising both an acrylamido fatty quaternary ammonium moiety and a heterocyclic ring moiety having at least five members, which ring has at least one nitrogen atom, said ring further comprising either unsaturation or at least one additional heteroatom;

C) an acryloyl alkylamino ethoxylate, an acryloyl alkylamino propoxylate, an acrylamido alkylamino ethoxylate, or an acrylamido alkylamino propoxylate;

D) an acryloyl trialkylhexahydrotriazine or an acrylamido trialkylhexahydrotriazine;

E) a fatty alkyl acrylate; or

F) an acryloyl or acrylamido compound comprising (I) an acryloyl ester of a polycarboxylic acid or polycarboxylate salt, an aminoalkylphosphate ester, or an ammoniumalkylphosphate ester, and (II) an alkanolamino group, a fatty quaternary ammonium moiety, a heterocyclic ring moiety having at least five members, which ring has at least one nitrogen atom, said ring further comprising either unsaturation or at least one additional heteroatom, or both a fatty quaternary ammonium moiety, and a heterocyclic ring moiety having at least five members, which ring has at least one nitrogen atom, said ring further comprising either unsaturation or at least one additional heteroatom, to form a polymer-making mixture, which mixture is heated to a temperature of at least about 60° C. to form a polymer; and 2) bringing together at least a portion of the polymer formed in 1) and reagents suitable for forming a polymer having side chain groups as described above for a), b), c), d), e), and/or f) on the polymer.

8. A process as in claim 7 wherein said vinyl compound is vinyl formamide.

9. In a method for scale inhibition, corrosion inhibition, gas hydrate inhibition, hydrogen sulfide scavenging, and/or paraffin inhibition in a well, central treating area, or refinery, an improvement which comprises introducing a polymer of claim 1 to a refinery continuously; to a storage facility of a refinery; or to an exit of a de-salter unit in a refinery.

10. A method as in claim 9 wherein said polymer is a homopolymer which has side chain groups selected from a); b); c); or f); or a bipolymer which has side chain groups selected from two different groups of a); a) and b); a) and c); a) and d); a) and e); b) and c); or a terpolymer which has side chain groups selected from three different groups of b); two different groups of a) and one group of b); one group of a) and two different groups of b); a), b), and c); or a), b), and d).

11. A method as in claim 9 wherein said side chain groups are b);

a) and b); one group of a) and two different groups of b); or a), b), and d).

12. A method as in any of claim 9, 10, or 11 wherein said group a) is a citrate ester in acid form, triammonium citrate ester, trisodium citrate ester, N,N-di(2-ethylphosphate)aminomethyl amide, or 1,3-bis[N,N,N-tri(2-ethylphosphate)ammonium chloride]propyl ester group; and/or said group b) is a 2-imidazolinylmethyl ester, amino-2-imidazolidinyl, N-2[3-(2-phenyl)-2-imidazolinyl]ethylamino methylamido, {N-2-[3-(2-phenyl)-(3-methylammonium)-2-imidazolinyl]ethyl} {(methylacrylamido)}dimethylammonium di(methylsulfate), N,N-bis(2-hydroxyethyl)aminomethyl amido, 2-(3-oxazolidinyl)ethyl ester, 2-{2-[methyl(2-pyrrolinyl)]3-oxazolidinyl}ethyl ester, or 2-{12-imido-3,6,9-triazatetracyclo[12.3.1.0$^{2,6}$.0$^{9,13}$]octadeca-1(18),14,16-trien-3-yl}ethylamino methylamido group; and/or said group c) is a N-(5-methylamido-1,3-dioxapentamethylene)amino methylamido group; and/or said group d) is a 2-(hexahydro-3,5-dicyclohexyl-1,3,5-triazinyl)ethyl ester group; and/or said groups e) are a mixture of groups having different chain lengths; and/or said group f) is a 2-[(citratoyl)dimethylammonium chloride]ethyl ester group.

13. A method as in claim 9 wherein said group a) is a citrate ester; and/or said group b) comprises a heterocyclic ring moiety in which the ring is a pyridyl, pyrrolinyl, imidazolidinyl, 2-imidazolinyl, or oxazolidinyl moiety; and/or said group d) is a trialkylhexahydrotriazine moiety having alkyl groups, which alkyl groups have two to about eight carbon atoms; and/or said group e) is an eicosyl, docosyl, or tetracosyl ester, or a mixture comprising one or more of these; and/or said group f) comprises (i) a citrate ester or salt thereof and (ii) a fatty quaternary ammonium moiety.

14. A method as in claim 9 wherein
said group b) comprises a heterocyclic ring moiety in which the ring is a pyridyl, pyrrolinyl, imidazolidinyl, 2-imidazolinyl, or oxazolidinyl moiety; and/or
said group f) comprises (i) a citrate ester or triammonium citrate and (ii) a fatty quaternary ammonium moiety.

15. A process for preparing polymers, which process comprises bringing together at least one free radical initiator and monomer species comprising at least one of the following:
  A) an acryloyl ester of a polycarboxylic acid or polycarboxylate salt, an acryloyl or acrylamido aminoalkylphosphate ester, or an acryloyl or acrylamido ammoniumalkylphosphate ester;
  B) an acryloyl alkanolamine, an acrylamido alkanolamine, an acryloyl fatty quaternary ammonium compound, an acrylamido fatty quaternary ammonium compound, an acryloyl or acrylamido compound comprising a heterocyclic ring moiety having at least five members, which ring has at least one nitrogen atom, said ring further comprising either unsaturation or at least one additional heteroatom, a compound comprising both an acrylamido fatty quaternary ammonium moiety and a heterocyclic ring moiety having at least five members, which ring has at least one nitrogen atom, said ring further comprising either unsaturation or at least one additional heteroatom;
  C) an acryloyl alkylamino ethoxylate, an acryloyl alkylamino propoxylate, an acrylamido alkylamino ethoxylate, or an acrylamido alkylamino propoxylate;
  D) an acryloyl trialkylhexahydrotriazine or an acrylamido trialkylhexahydrotriazine;
  E) a fatty alkyl acrylate; or
  F) an acryloyl or acrylamido compound comprising (I) an acrylolyl ester of a polycarboxylic acid or polycarboxylate salt, an aminoalkylphosphate ester, or an ammoniumalkylphosphate ester, and (II) an alkanolamino group, a fatty quaternary ammonium moiety, a heterocyclic ring moiety having at least five members, which ring has at least one nitrogen atom, said ring further comprising either unsaturation or at least one additional heteroatom, or both a fatty quaternary ammonium moiety and a heterocyclic ring moiety having at least five members, which ring has at least one nitrogen atom, said ring further comprising either unsaturation or at least one additional heteroatom,
to form a polymerization mixture, which polymerization reaction mixture is heated to a temperature of at least about 60° C. to form a polymer.

16. A process as in claim 15 or 7 wherein
said monomer species A) is an acryloyl citrate ester; and/or
said monomer species B) is an acryloyl or acrylamido compound that comprises a heterocyclic ring moiety; and/or
said monomer species D) is a trialkylhexahydrotriazine moiety having alkyl groups, which alkyl groups have two to about eight carbon atoms; and/or
said monomer species E) is eicosyl acrylate, docosyl acrylate, or tetracosyl acrylate, or a mixture comprising one or more of these; and/or
said monomer species F) comprises (I) an acryloyl citrate or salt thereof and (II) an imidazoline or a fatty quaternary ammonium moiety.

17. A process as in claim 15 or 7 wherein
said monomer species B) is an acryloyl or acrylamido compound that comprises a heterocyclic ring moiety in which the ring is a pyridyl, pyrrolinyl, imidazolidinyl, 2-imidazolinyl, or oxazolidinyl moiety; and/or
said monomer species F) comprises (I) an acryloyl citrate or triammonium acryloyl citrate and (II) a fatty quaternary ammonium moiety.

18. A process as in claim 15 or 7 wherein said free radical initiator is azobiscyanovaleric acid.

19. A process as in claim 15 or 7 further comprising contacting at least a portion of said polymer with a quaternizing agent.

20. A process as in claim 15 wherein
a homopolymer is formed, and the monomer species is A), B), C), or F); or a bipolymer is formed, and the monomer species are two different monomer species of A); A) and B); A) and C); A) and D); A) and E); B) and C); or a terpolymer is formed, and the monomer species are three different monomer species of B); two different monomer species of A) and one monomer species of B); one monomer species of A) and two different monomer species of B); A), B), and C); or A), B), and D).

21. A process as in claim 15 wherein said monomer species are B);
A) and B); one monomer species of A) and two different monomer species of B); or A), B), and D).

22. A process as in any of claims 15-21 wherein
said monomer species A) is acryloyl citrate, acryloyl triammonium citrate, acryloyl trisodium citrate, N,N-di(2-ethylphosphate)aminomethyl amide, or 1,3-bis[N,N,N-tri(2-ethylphosphate)ammonium chloride]propyl ester; and/or
said monomer species B) is 2-imidazolinylmethyl acrylate, 2-imidazolidinyl vinylamine, N-2-[3-(2-phenyl)-2-imidazolinyl]ethylamino methyl acrylamide, {N-2-[3-(2-phenyl)-(3-methylammonium)-2-imidazolinyl]ethyl} {(methylacrylamide)}dimethylammonium di(methylsulfate), N,N-bis(2-hydroxyethyl)aminomethyl acrylamide, 2-(3-oxazolidinyl)ethyl acrylate, 2-{2-[methyl(2-pyrrolinyl)]3-oxazolidinyl}ethyl acrylate, or 2-{12-imido-3,6,9-triazatetracyclo[12.3.1.0$^{2.6}$.0$^{9.13}$]octadeca-1(18),14,16-trien-3-yl}ethylamino methylamide; and/or
said monomer species C) is N-(5-methylamido-1,3-dioxapentamethylene)amino methylacrylamide; and/or
said monomer species D) is 2-(hexahydro-3,5-dicyclohexyl-1,3,5-triazinyl)ethyl acrylate; and/or
said monomer species E) are a mixture of esters having different chain lengths; and/or
said monomer species F) is (acryloylethyl)(citratoyl)dimethylammonium chloride.

23. A composition of matter which is
A) an acryloyl ester of a polycarboxylic acid or polycarboxylate salt, an acryloyl or acrylamido aminoalkylphosphate ester, or an acryloyl or acrylamido ammoniumalkylphosphate ester; or
B) an acryloyl alkanolamine, an acrylamido alkanolamine, an acryloyl fatty quaternary ammonium compound, an acrylamido fatty quaternary ammonium compound, an acryloyl or acrylamido compound comprising a heterocyclic ring moiety having at least five members, which ring has at least one nitrogen atom, said ring further comprising either unsaturation or at least one additional heteroatom, a compound comprising both an acrylamido fatty quaternary ammonium moiety and a heterocyclic ring moiety having at least five members, which ring has at least one nitrogen atom, said ring further comprising either unsaturation or at least one additional heteroatom; or C) an acryloyl alkylamino ethoxylate, an acryloyl alkylamino propoxylate, an acrylamido alkylamino ethoxylate, or an acrylamido alkylamino propoxylate; or D) an acryloyl trialkylhexahydrotriazine or an acrylamido trialkylhexahydrotriazine; or E) a fatty alkyl acrylate; or F) an acryloyl or acrylamido compound comprising (I) an acryolyl ester of a polycarboxylic acid or polycarboxylate salt, an aminoalkylphosphate ester, or an ammoniumalkylphosphate ester, and (II) an alkanolamino group, a fatty quaternary ammonium moiety, a heterocyclic ring moiety having at least five members, which ring has at least one nitrogen atom, said ring further comprising either unsaturation or at least one additional heteroatom, or both a fatty quaternary ammonium moiety and a heterocyclic ring moiety having at least five members, which ring has at least one nitrogen atom, said ring further comprising either unsaturation or at least one additional heteroatom.

24. A composition as in claim 23 wherein
A) is an acryloyl citrate ester;
B) is an acryloyl or acrylamido compound that comprises a heterocyclic ring moiety;
D) is a trialkylhexahydrotriazine moiety having alkyl groups, which alkyl groups have two to about eight carbon atoms;
E) is eicosyl acrylate, docosyl acrylate, or tetracosyl acrylate, or a mixture comprising one or more of these; or
F) comprises (I) an acryloyl citrate ester or salt thereof and (II) an imidazoline or a fatty quaternary ammonium moiety.

25. A composition as in claim 23 wherein
B) is an acryloyl or acrylamido compound that comprises a heterocyclic ring moiety in which the ring is a pyridyl, pyrrolinyl, imidazolidinyl, 2-imidazolinyl, or oxazolidinyl moiety;
F) comprises (I) acryloyl citrate or triammonium acryloyl citrate and (II) a fatty quaternary ammonium moiety.

26. A composition as in claim 23 wherein
A) is acryloyl citrate, acryloyl triammonium citrate, acryloyl trisodium citrate, N,N-di(2-ethylphosphate)aminomethyl amide, or 1,3-bis[N,N,N-tri(2-ethylphosphate)ammonium chloride]propyl ester;
B) is 2-imidazolinylmethyl acrylate, 2-imidazolidinyl vinylamine, N-2-[3-(2-phenyl)-2-imidazolinyl]ethylamino methyl acrylamide, {N-2-[3-(2-phenyl)-(3-methylammonium)-2-imidazolinyl]ethyl} {(methylacrylamide)}dimethylammonium di(methylsulfate), N,N-bis (2-hydroxyethyl)aminomethyl acrylamide, 2-(3-oxazolidinyl)ethyl acrylate, 2-{2-[methyl(2-pyrrolinyl)]3-oxazolidinyl}ethyl acrylate, or 2-{12-imido-3,6,9-triazatetracyclo[12.3.1.0$^{2.6}$.0$^{9.13}$]octadeca-1(18),14,16-trien-3-yl}ethylamino methylamide;
C) is N-(5-methylamido-1,3-dioxapentamethylene)amino methylacrylamide;
D) is 2-(hexahydro-3,5-dicyclohexyl-1,3,5-triazinyl)ethyl acrylate;
E) is a mixture of esters having different chain lengths; or
F) is (acryloylethyl)(citratoyl)dimethylammonium chloride.

27. A method for preparing compositions as in claim 23, which method comprises
when composition A) is an acryloyl or acrylamido aminoalkylphosphate ester, i) bringing together a dialkanolamine or a trialkanolamine and polyphosphoric acid, to form an alkylaminophosphate ester; and ii) bringing together at least a portion of an alkylaminophosphate ester formed in i), an acrylic reagent, and formaldehyde, forming the acryloyl or acrylamido aminoalkylphosphate ester;
when composition A) is an acryloyl or acrylamido ammoniumalkylphosphate ester, bringing together an acryloyl or acrylamido aminoalkylphosphate ester, an acrylic reagent, and an epoxide having a haloalkyl substituent, forming the acryloyl or acrylamido ammoniumalkylphosphate ester;
when the composition is C), i) bringing together an alkyl anhydride, an ethoxylated or propoxylated alkylamine, and a strong base, forming an ethoxylated or propoxylated alkylamino alkylamide; ii) bringing together at least a portion of the ethoxylated or propoxylated alkylamino alkylamide formed in i), an acrylic reagent, and optionally formaldehyde, forming an acryloyl or acrylamido alkylamino ethoxylate or propoxylate;
when the composition is D), i) bringing together a monoalkylamine, a monoalkanolamine, and formaldehyde, forming a 1-alkanol-3,5-dialkylhexahydrotriazine; ii) bringing together at least a portion of the a 1-alkanol-3,5-dialkylhexahydrotriazine formed in i) and an acrylic reagent, to form an acryloyl or acrylamido trialkylhexahydrotriazine;
when the composition is E), bringing together a fatty alkyl alcohol and an acrylic reagent, forming a fatty alkyl acrylate.

28. A method as in claim 27 wherein
when preparing a composition A) which is an acryloyl or acrylamido aminoalkylphosphate ester,
said dialkanolamine is diethanolamine, or said trialkanolamine is triethanolamine; and/or
said acrylic reagent is acrylic acid or acrylamide;
when preparing a composition A) which is an acryloyl or acrylamido ammoniumalkylphosphate ester,
said acrylic reagent is acrylic acid or acrylamide; and/or
said epoxide is epichlorohydrin;
when preparing a composition C),
said acrylic reagent is acrylamide;
said alkyl anhydride is acetic anhydride;
said ethoxylated or propoxylated alkylamine is triethylene glycol diamine; and/or
said base is sodium hydroxide is a preferred base;
when preparing a composition D),
said acrylic reagent is acrylic acid;
said monoalkylamine is cyclohexylamine; and/or
said monoalkanolamine is ethanolamine;
when preparing a composition E),
said fatty alcohol is eicosol, docosol, and tetracosol, or a mixture comprising one or more of these alcohols; and/or
said acrylic reagent is acrylic acid.

* * * * *

UNITED STATES PATENT AND TRADEMARK OFFICE
CERTIFICATE OF CORRECTION

| | | |
|---|---|---|
| PATENT NO. | : 8,114,819 B2 | Page 1 of 1 |
| APPLICATION NO. | : 12/561740 | |
| DATED | : February 14, 2012 | |
| INVENTOR(S) | : Harold L. Becker | |

It is certified that error appears in the above-identified patent and that said Letters Patent is hereby corrected as shown below:

Column 30, line 24 reads "A process as in any of claims 15-21 wherein" and should read -- A process as in any of claims 7, 15, 20, or 21 wherein --

Signed and Sealed this
Eighth Day of May, 2012

David J. Kappos
*Director of the United States Patent and Trademark Office*